United States Patent
Takata et al.

(10) Patent No.: US 11,792,852 B2
(45) Date of Patent: Oct. 17, 2023

(54) TERMINAL, BASE STATION, TRANSMITTING METHOD, AND RECEIVING METHOD

(71) Applicant: Panasonic Intellectual Property Corporation of America, Torrance, CA (US)

(72) Inventors: Tomofumi Takata, Ishikawa (JP); Hidetoshi Suzuki, Kanagawa (JP); Takashi Iwai, Ishikawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 117 days.

(21) Appl. No.: 17/255,914

(22) PCT Filed: Apr. 5, 2019

(86) PCT No.: PCT/JP2019/015085
§ 371 (c)(1),
(2) Date: Dec. 23, 2020

(87) PCT Pub. No.: WO2020/031427
PCT Pub. Date: Feb. 13, 2020

(65) Prior Publication Data
US 2021/0274551 A1    Sep. 2, 2021

(30) Foreign Application Priority Data
Aug. 7, 2018    (JP) .................................. 2018-148463

(51) Int. Cl.
*H04W 74/08*    (2009.01)
*H04L 27/26*    (2006.01)
(Continued)

(52) U.S. Cl.
CPC ..... *H04W 74/0816* (2013.01); *H04L 27/2636* (2013.01); *H04W 72/0453* (2013.01); *H04W 72/21* (2023.01)

(58) Field of Classification Search
CPC ......... H04W 74/0816; H04W 72/0413; H04W 72/0453; H04W 16/14; H04L 27/2636; H04L 5/0044; H04L 5/0053
See application file for complete search history.

(56) References Cited

U.S. PATENT DOCUMENTS 10,419,185 B2 *  9/2019  Mukherjee ............ H04L 5/0053
10,455,559 B2 * 10/2019  Fodor ............... H04W 72/0413
(Continued)

FOREIGN PATENT DOCUMENTS

JP           6309985 B2    4/2018

OTHER PUBLICATIONS

3GPP TS 38.211 V15.2.0, "3rd Generation Partnership Project; Technical Specification Group Radio Access Network; NR; Physical channels and modulation (Release 15)," Jun. 2018, 96 pages.
(Continued)

*Primary Examiner* — Brian T O'Connor
(74) *Attorney, Agent, or Firm* — Seed IP Law Group LLP

(57) ABSTRACT

Provided is a terminal capable of transmitting an uplink signal appropriately in an unlicensed band. In a terminal (100), a resource allocating unit (107) allocates uplink signals to each of a plurality of bands into which a prescribed frequency band has been divided. Each of the plurality of bands is a unit for determining whether a resource is being used by another device. A radio transmitting unit (109) transmits the uplink signals.

14 Claims, 24 Drawing Sheets

(51) Int. Cl.
*H04W 72/0453* (2023.01)
*H04W 72/21* (2023.01)

(56) References Cited

U.S. PATENT DOCUMENTS

| | | | | |
|---|---|---|---|---|
| 10,523,373 | B2* | 12/2019 | Chen | H04L 1/1896 |
| 11,223,982 | B2* | 1/2022 | Zhang | H04W 48/16 |
| 2019/0174542 | A1* | 6/2019 | Lei | H04W 74/0816 |
| 2019/0313454 | A1* | 10/2019 | Pu | H04W 28/20 |
| 2019/0373613 | A1* | 12/2019 | Harada | H04L 5/0078 |
| 2020/0374887 | A1* | 11/2020 | Tang | H04B 7/0626 |
| 2020/0404706 | A1* | 12/2020 | Karaki | H04L 1/1822 |
| 2021/0022012 | A1* | 1/2021 | Chen | H04W 16/14 |
| 2021/0105630 | A1* | 4/2021 | Ishikura | H04W 16/32 |
| 2021/0120546 | A1* | 4/2021 | Tang | H04L 5/0044 |
| 2021/0250967 | A1* | 8/2021 | Ye | H04W 16/14 |
| 2021/0344448 | A1* | 11/2021 | Nogami | H04L 1/1812 |

OTHER PUBLICATIONS

3GPP Ts 38.212 V15.2.0, "3rd Generation Partnership Project; Technical Specification Group Radio Access Network; NR; Multiplexing and channel coding (Release 15)," Jun. 2018, 98 pages.

3GPP TS 36.213 V15.1.0, "3rd Generation Partnership Project; Technical Specification Group Radio Access Network; Evolved Universal Terrestrial Radio Access (E-UTRA); Physical layer procedures (Release 15) The present," Mar. 2018, 499 pages.

Huawei, HiSilicon, "HARQ enhancements in NR unlicensed," R1-1805918, Agenda Item: 7.6.4.3, 3GPP TSG RAN WG1 Meeting #93, Busan, Korea, May 21-25, 2018, 5 pages.

Huawei, HiSilicon, "Numerology and wideband operation in NR unlicensed," R1-1803677, Agenda Item: 7.6.5, 3GPP TSG RAN WG1 Meeting #92bis, Sanya, China, Apr. 16-20, 2018, 8 pages.

International Search Report, dated Jun. 25, 2019, for corresponding International Application No. PCT/JP2019/015085, 4 pages.

LG Electronics, "Discussion on configured grant for NR unlicensed operation," R1-1806648, Agenda Item: 7.6.4.4, 3GPP TSG RAN WG1 Meeting #93, Busan, Korea, May 21-25, 2018, 4 pages.

LG Electronics, "Physical layer design of UL signals and channels for NR unlicensed operation," R1-1806644, Agenda Item: 7.6.3.2, 3GPP TSG RAN WG1 Meeting #93, Busan, Korea, May 21-25, 2018, 4 pages.

MCC Support, "Final Report of 3GPP TSG RAN WG1 #92bis v1.0.0 (Sanya, China, Apr. 16-20, 2018)," R1-1805801, 3GPP TSG RAN WG1 Meeting #93, Busan, South Korea, May 21-25, 2018, 195 pages.

NEC, "Discussion on subband based channel access procedures for NR-U," R1-1806670, Agenda item: 7.6.4.1, 3GPP TSG RAN WG1 Meeting #93, Busan, Korea, May 21-25, 2018, 3 pages.

* cited by examiner

201: CONTROLLER

- 202 LBT UNIT DESIGNATOR
- 203 RESOURCE ALLOCATOR
- 204 CONTROL INFORMATION GENERATOR
- 205 ENCODER/MODULATOR
- 206 RADIO TRANSMITTER
- 207 (antenna)
- 208 RADIO RECEIVER
- 209 SIGNAL DETECTOR
- 601 UCI RESOURCE RE-DETERMINER
- 602 DEMODULATOR/DECODER

TERMINAL, BASE STATION, TRANSMITTING METHOD, AND RECEIVING METHOD

TECHNICAL FIELD

The present disclosure relates to a terminal, a base station, a transmission method, and a reception method.

BACKGROUND ART

In the standardization of 5G, a new radio access technology (NR) that is not necessarily backward compatible with LTE/LTE-Advanced has been discussed in 3GPP. Like LTE-LAA (License-Assisted Access), in NR, an operation in the unlicensed band is also discussed (refer to, for example, NPL 1).

CITATION LIST

Non-Patent Literature

NPL 1
MCC Support, R1-1805801, "Final Report of 3GPP TSG RAN WG1 #92bis v1.0.0", 3GPP TSG-RAN WG1 Meeting #93, May 2018
NPL 2
3GPP TS 36.213 V15.1.0, "Physical layer procedures (Release 15)", 2018-03
NPL 3
3GPP TS 38.211 V15.2.0, "Physical channels and modulation (Release 15)", 2018-6
NPL 4
Huawei, R1-1803677, "Numerology and wideband operation in NR unlicensed", 3GPP TSG-RAN WG1 Meeting #92bis, April 2018
NPL 5
3GPP TS 38.212 V15.2.0, "Multiplexing and channel coding (Release 15)", 2018-6

SUMMARY OF INVENTION

However, a method for transmitting an uplink signal in the unlicensed band has not been sufficiently studied.

One non-limiting and exemplary embodiment of the present disclosure facilitates providing a terminal, a base station, a transmission method, and a reception method capable of appropriately transmitting an uplink signal in an unlicensed band.

A terminal according to one embodiment of the present disclosure includes: circuitry, which, in operation, assigns an uplink signal to each of a plurality of bands obtained by dividing a predetermined frequency band, each of the plurality of bands serving as a unit for determining use or non-use of a resource by another apparatus; and a transmitter, which in operation, transmits the uplink signal.

A base station according to one embodiment of the present disclosure includes: circuitry, which, in operation, determines a resource to which an uplink signal is assigned for each of a plurality of bands obtained by dividing a predetermined frequency band, each of the plurality of bands serving as a unit for determining use or non-use of a resource by another apparatus; and a receiver, which in operation, receives the uplink signal in the determined resource.

A transmission method according to one embodiment of the present disclosure includes: assigning an uplink signal to each of a plurality of bands obtained by dividing a predetermined frequency band, each of the plurality of bands serving as a unit for determining use or non-use of a resource by another apparatus; and transmitting the uplink signal.

A reception method according to one embodiment of the present disclosure includes: determining a resource to which an uplink signal is to be assigned for each of a plurality of bands obtained by dividing a predetermined frequency band, each of the plurality of bands serving as a unit for determining use or non-use of a resource by another apparatus; and receiving the uplink signal in the determined resource.

It should be noted that general or specific embodiments may be implemented as a system, a method, an integrated circuit, a computer program, a storage medium, or any selective combination thereof.

According to one embodiment of the present disclosure, an uplink signal can be appropriately transmitted in the unlicensed band.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 20 is a block diagram illustrating the configuration of a base station according to Embodiment 3;

DESCRIPTION OF EMBODIMENTS

Figure 1:
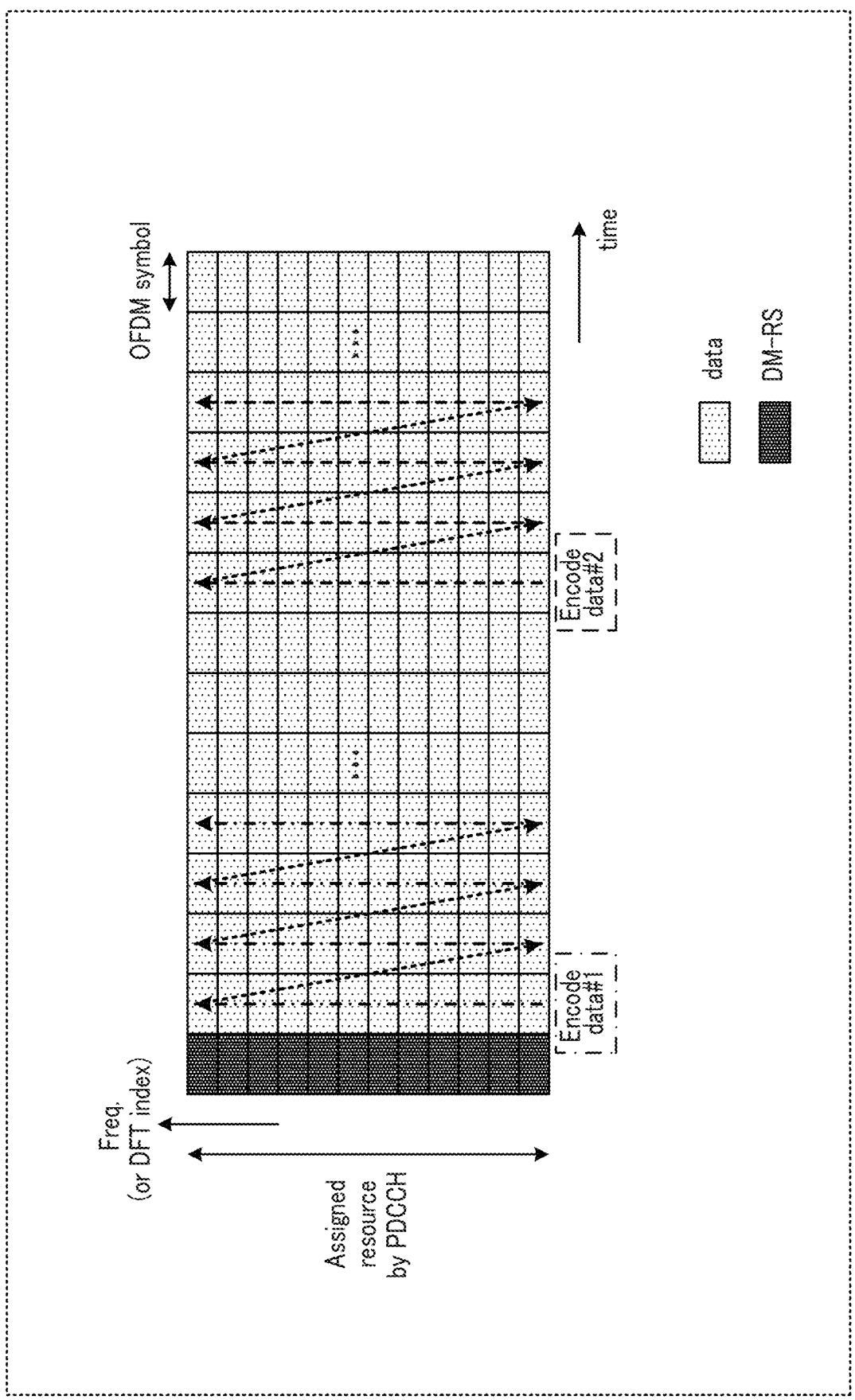
FIG. 1 is an example of resource allocation in a license band.

Embodiments of the present disclosure are described in detail below with reference to the accompanying drawings.

In NR, the operation in only an unlicensed band (or an unlicensed spectrum) is assumed (referred to as "NR stand-alone"). To achieve NR stand-alone, a terminal (for example, UE: User Equipment) needs to transmit uplink control information (for example, UCI: Uplink Control Information) in the unlicensed band.

However, the transmission method for transmitting uplink data (for example, UL-SCH: Uplink Shared Channel) and UCI in the unlicensed band has not been sufficiently studied.

[LBT Control]

In the unlicensed band, a frequency band is shared with other systems, such as Wi-Fi (registered trademark), or other base stations and other terminals (for example, these are collectively referred to as "other apparatuses") in the same system (for example, an NR system). Accordingly, control for preventing collisions with signals of other systems (that is, other apparatuses) is prescribed.

For example, each terminal (UE) and a base station (also referred to as "gNB") measure, for example, the received power of a signal in a predetermined frequency band before transmitting a signal and determines whether the measured received power exceeds a predetermined threshold value that is prescribed in advance.

If the measured received power is less than or equal to the predetermined threshold value, the terminal and the base station determine that the frequency band is in an "idle" mode (that is, another terminal or another base station does not transmit a signal). Thus, the terminal and the base station can transmit a signal. However, if the measured received power is greater than the predetermined threshold value, the terminal and the base station determine that the frequency band is in a "Busy" mode (that is, in a mode in which another terminal or another base station is transmitting a signal).). Thus, the terminal and the base station does not transmit a signal.

The operation of determining whether the frequency band is in the idle mode or the Busy mode before transmitting a signal is referred to as "LBT (Listen Before Talk)". Note that LBT is also referred to as CCA (Clear Channel Assessment) or carrier sense, for example.

In LTE-LAA, two types (Type 1 and Type 2) of methods are defined for the LBT operation performed by a terminal that transmits an uplink signal (refer to, for example, NPL 2).

For example, in the case of Type 2, the terminal performs LBT for a predetermined interval (for example, a 25 us interval) immediately before the time designated by the base station to transmit an uplink signal (the transmission time). If the frequency band in which the uplink signal is to be transmitted is in an idle mode, the terminal transmits an uplink signal. However, if the frequency band is in a Busy mode, the terminal does not transmit the uplink signal. That is, the terminal transmits an uplink signal in the frequency band immediately after detecting the frequency band (or the channel) being in the idle mode in the predetermined interval (for example, a 25 us interval).

In LTE-LAA, LBT control is performed in units of Component Carriers. In contrast, in NR, the bandwidth of one Component Carrier is wider than that of LTE. For this reason, in NR, it was agreed that one Component Carrier is divided into a plurality of bands, and LBT control is performed for each of the plurality of bands. Hereinafter, a unit of frequency bandwidth subjected to LBT control (for example, a unit for which it is determined whether a resource is used by another apparatus) is referred to as an "LBT Unit". Note that in NR, discussion of the details of the band subjected to LBT control is still under way.

The LBT Unit may be indicated to the terminal by using, for example, cell common information or quasi-static indication information (for example, a higher layer parameter). Alternatively, the LBT Unit may be indicated to the terminal by using dynamic indication information using PDCCH (Physical Downlink Control Channel) including Downlink Control Information (for example, DCI). In addition, at least part of the control information related to the LBT Unit may be the system common information defined in the specification, and the information need not be indicated to the terminal by the base station. Note that in NR, PDCCH is also referred to as "NR-PDCCH".

[PUSCH in NR Licensed Band]

In the NR licensed band, the following two types of transmission methods for transmission in an uplink data channel (for example, PUSCH: Physical Uplink Shared Channel) are applicable: OFDM (Orthogonal Frequency Divisional Multiplexing) and DFT-S-OFDM (Discrete Fast Fourier-Spread-OFDM) (refer to, for example, NPL 3).

In PUSCH of the NR licensed band, for example, as illustrated in FIG. 1, in the case of OFDM transmission in the band for transmitting an uplink signal in a single Component Carrier (an allocated resource) designated by PDCCH containing the downlink control information, the encoded data or reference signal (e.g., DM-RS: Demodulation Reference Signal) is assigned to the resource, in order from the first OFDM symbol in the frequency direction (also referred to as Frequency first mapping). If the size of transmitted data is large, the data is divided into a plurality of blocks (referred to as "data blocks"), and error correction coding (referred to as "encoding") is performed for each of the blocks. In this case, each of the encoded blocks (in the example illustrated in FIG. 1, Encode data #1 and Encode data #2) is assigned to a resource in sequence.

Similarly, in the case of DFT-S-OFDM, for example, as illustrated in FIG. 1, before DFT processing, the encoded data blocks or a reference signal is assigned to the resource in sequence, from the first OFDM symbol in the DFT-index direction (also referred to as DFT domain). After assigning the resource, the terminal performs DFT processing based on the band size for transmitting the uplink signal (the size of the allocated resource in FIG. 1) on each of the OFDM symbols and converts the OFDM symbol into a signal in the frequency domain.

[PUSCH in NR Unlicensed Band]

Figure 2:
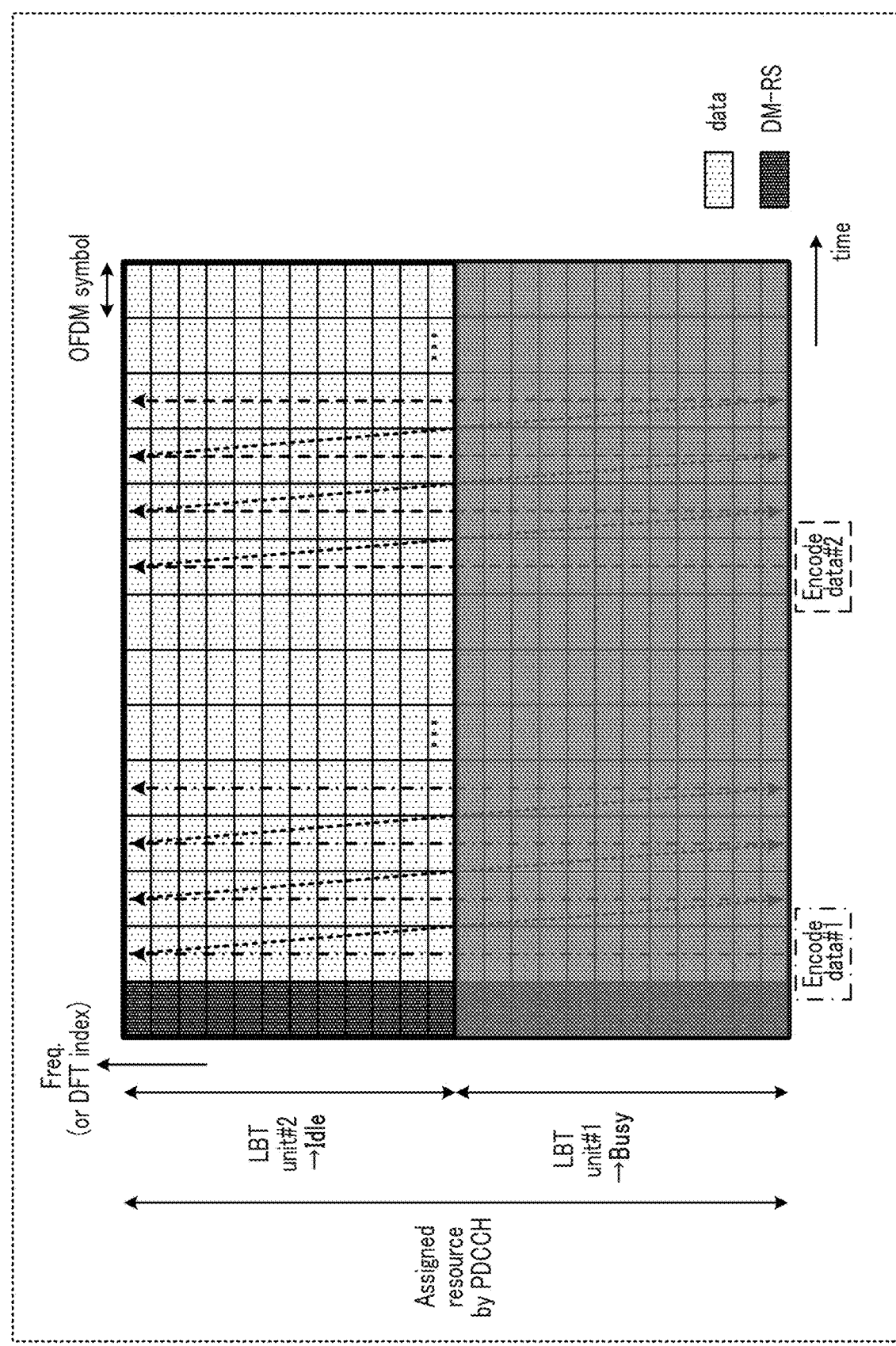
FIG. 2 is an example of resource allocation in an unlicensed band.

In the NR unlicensed band, for example, as illustrated in FIG. 2, a plurality of LBT units (LBT unit #1 and LBT unit #2 in FIG. 2) may exist in the PUSCH radio resource (hereinafter referred to as a PUSCH resource) allocated by the PDCCH.

In this case, if the LBT result of one or more LBT units is Busy, the terminal cannot transmit a signal in the band corresponding to the LBT unit. For example, in the example illustrated in FIG. 2, the LBT result of LBT unit #1 is busy, and the LBT result of LBT unit #2 is idle.

Since LBT control is started immediately before PUSCH transmission (for example, before 25 us), the period of time from the time the terminal determines the LBT result until PUSCH transmission is started is short. For this reason, it is highly likely that re-encoding or re-rate matching of data cannot be performed in accordance with the LBT result. Therefore, it has been studied that the terminal discards (also referred to as "punctures") the transmission signal (for example, data and a reference signal) of the LBT unit (LBT unit #1 in FIG. 2) having an LBT result being Busy (refer to, for example, NPL 4).

In addition, as illustrated in FIG. 2, in the band allocated to transmission of the uplink signal (the allocated resource in FIG. 2), each of the encoded data blocks (for example, Encode data #1 and Encode data #2) is assigned to a resource by Frequency first mapping. In this case, as illustrated in FIG. 2, when the transmission signal of LBT unit #1 is discarded under LBT control, about half of each of Encode data #1 and Encode data #2 (that is, the encoded data assigned to LBT unit #1) is not transmitted.

Therefore, it is highly likely that the base station cannot correctly receive the data in the first transmission even when an error correction is performed on the reception signal and, thus, the system performance degrades (for example, delay in data transmission/reception increases, or the throughput decreases).

Accordingly, in one embodiment of the present disclosure, a method is described that is capable of appropriately transmitting uplink data and UCI without degrading the system performance even when a plurality of LBT units are set in the unlicensed band for a terminal.

Embodiment 1

[Overview of Communication System]

The communication system according to the present embodiment includes terminal 100 and base station 200.

Figure 3:
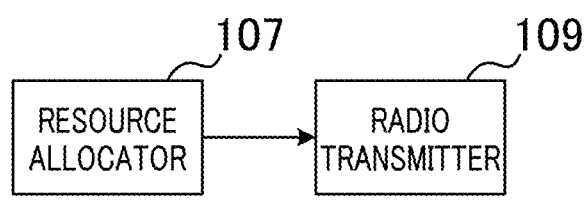
FIG. 3 is a block diagram illustrating part of the configuration of a terminal according to Embodiment 1.

FIG. 3 is a block diagram illustrating part of the configuration of terminal 100 according to the present embodiment. In terminal 100 illustrated in FIG. 3, resource allocator 107 assigns an uplink signal to each of a plurality of bands (for example, LBT units) obtained by dividing a predetermined frequency band. Each of the plurality of bands is a unit of determination as to whether a resource (or a channel) is used by another apparatus. Radio transmitter 109 transmits an uplink signal.

Figure 4:
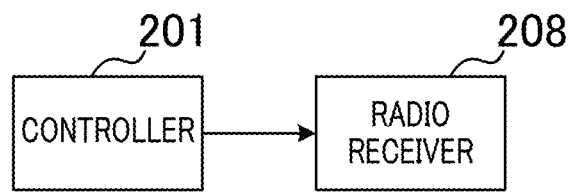
FIG. 4 is a block diagram illustrating part of the configuration of a base station according to Embodiment 1.

FIG. 4 is a block diagram illustrating part of the configuration of base station 200 according to the embodiment of the present disclosure. In base station 200 illustrated in FIG. 4, controller 201 determines a resource to which an uplink signal is to be assigned for each of a plurality of bands (for example, LBT units) obtained by dividing a predetermined frequency band. Each of the plurality of bands is a unit of determination as to whether a resource is used by another apparatus. Radio receiver 208 receives the uplink signal at the determined resource.

[Terminal Configuration]

Figure 5:
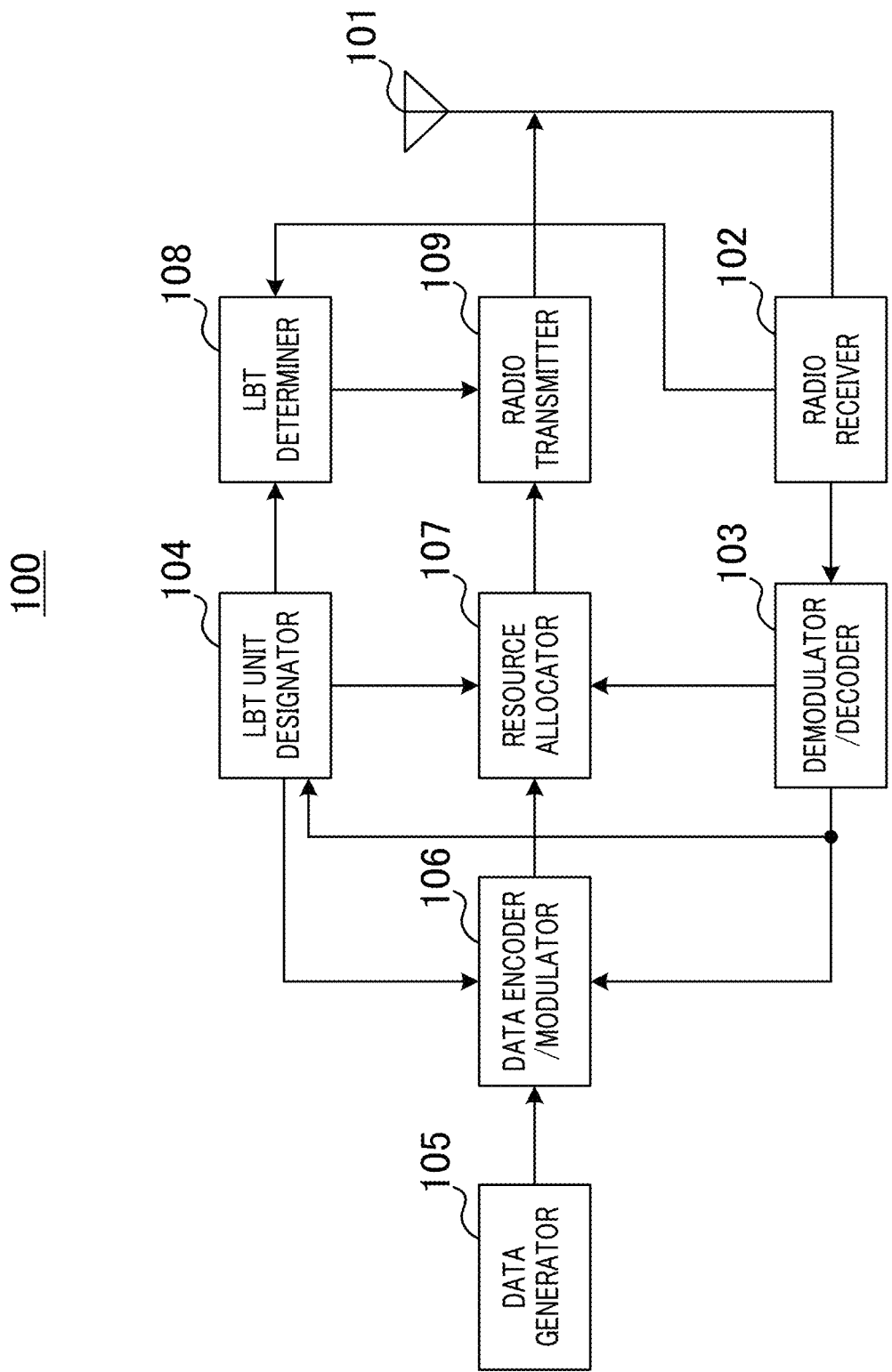
FIG. 5 is a block diagram illustrating the configuration of the terminal according to Embodiment 1.

FIG. 5 is a block diagram illustrating the configuration of terminal 100 according to the present embodiment.

In FIG. 5, terminal 100 includes antenna 101, radio receiver 102, demodulator/decoder 103, LBT unit designator 104, data generator 105, data encoder/modulator 106, resource allocator 107, LBT determiner 108, and radio transmitter 109.

Radio receiver 102 performs reception processing, such as down-conversion and A/D conversion, on a reception signal received from base station 200 via antenna 101 and outputs the reception signal obtained through the reception processing to demodulator/decoder 103 and LBT determiner 108.

Demodulator/decoder 103 demodulates and decodes the reception signal input from radio receiver 102 and extracts, from the decoding result, the control information (for example, DCI, etc.) transmitted from base station 200 to terminal 100. Thereafter, demodulator/decoder 103 outputs the control information to LBT unit designator 104, data encoder/modulator 106, and resource allocator 107. The control information destined for terminal 100 is, for example, UL grant (e.g., PDCCH or NR-PDCCH) and includes DCI for scheduling PUSCH for terminal 100.

The DCI includes, for example, information indicating a frequency resource, information indicating a time resource, information indicating MCS (Modulation and Coding Scheme), information indicating the transmission power, information indicating Payload size, information regarding retransmission control, or information regarding LBT control. Furthermore, the information regarding LBT control includes, for example, information indicating the type of LBT applied at the time of PUSCH transmission (for example, Type 1 LBT and Type 2 LBT in LTE-LAA) or information regarding the LBT unit.

Note that all the control information do not have to be indicated to terminal 100 at the same time. For example, at least part of the control information may be indicated from base station 200 to terminal 100 in the form of cell common information or quasi-static indication information. In addition, at least part of the control information may be prescribed in the specification as, for example, system common information and need not be indicated from base station 200 to terminal 100.

LBT unit designator 104 calculates, for example, the LBT unit (for example, the bandwidth, frequency place, or the like) set in terminal 100 on the basis of the control information input from demodulator/decoder 103. LBT unit designator 104 outputs the calculated information regarding the LBT unit to data encoder/modulator 106, resource allocator 107, and LBT determiner 108.

Data generator 105 generates data to be transmitted by terminal 100 (for example, UL-SCH) and outputs the generated transmission data to data encoder/modulator 106.

Data encoder/modulator 106 divides the transmitted data input from data generator 105 into pieces of data each assigned to one of the LBT units on the basis of information regarding the LBT unit (for example, the bandwidth or frequency place, etc.) input from LBT unit designator 104. In addition, data encoder/modulator 106 encodes and modulates the transmission data on a per LBT unit basis on the basis of the control information (for example, MCS) input from demodulator/decoder 103 and outputs the modulated data signal to resource allocator 107.

Note that the encoding in data encoder/modulator 106 is not limited to encoding performed for each piece of data assigned to an LBT unit. The piece of data assigned to an LBT unit may be divided into a plurality of blocks, and encoding may be performed on each block. As an example, data encoder/modulator 106 performs encoding in units of CBs (Code Blocks), which is a unit to perform LDPC code in NR, and a CBG (Code Block Group) obtained by grouping a plurality of CBs may be considered to be a piece of data assigned to one of the LBT units.

Resource allocator 107 assigns the data signal input from data encoder/modulator 106 to a radio resource (for example, a frequency resource or a time resource) on the basis of the control information (for example, a frequency resource or a time resource) input from demodulator/decoder 103 and the information regarding the LBT unit (for example, the bandwidth or frequency place, etc.) input from LBT unit designator 104. For example, resource allocator 107 assigns transmission data to each of the LBT units set in terminal 100. Resource allocator 107 outputs, to radio transmitter 109, a transmission signal (which may include a reference signal) after the resource allocation.

LBT determiner 108 performs LBT determination on a per LBT unit basis on the basis of the information regarding the LBT unit input from LBT unit designator 104 and the reception signal input from radio receiver 102. For example, LBT determiner 108 measures the reception signal power on a per LBT unit basis by using the reception signal immediately before transmission of the transmission signal (that is, PUSCH) performed by terminal 100 (for example, the 25 us interval immediately before PUSCH transmission). Thereafter, for example, if the received power measured in the LBT unit is greater than a predetermined threshold value, LBT determiner 108 determines that the channel state of the frequency band corresponding to the LBT unit is the Busy mode. However, for example, if the received power measured for the LBT unit is less than or equal to the predetermined threshold value, LBT determiner 108 determines that the channel state of the frequency band corresponding to the LBT unit is the idle mode. LBT determiner 108 outputs the information indicating the channel state of each of the LBT units (the LBT result) to radio transmitter 109.

Among the transmission signals input from resource allocator 107, radio transmitter 109 discards the signal in the band corresponding to the LBT unit having the LBT result being Busy on the basis of the LBT determination result input from LBT determiner 108. In addition, radio transmitter 109 performs IFFT (Inverse Fast Fourier Transform) processing on the signal in the band corresponding to the LBT unit having the LBT result being idle among the transmission signals input from resource allocator 107 and generates a time domain signal. Radio transmitter 109 performs transmission processing, such as D/A conversion and up-conversion, on the signal in the time domain and transmits a radio signal obtained through the transmission processing from antenna 101 to base station 200.

Note that for example, in the case of OFDM transmission (that is, multi-carrier transmission), a CP (Cyclic Prefix) may be added to the signal in the time domain (not illustrated). Alternatively, in the case of DFT-S-OFDM transmission (that is, single carrier transmission), DFT processing may be performed on the signal output from resource allocator 107 (not illustrated).

[Base Station Configuration]

Figure 6:
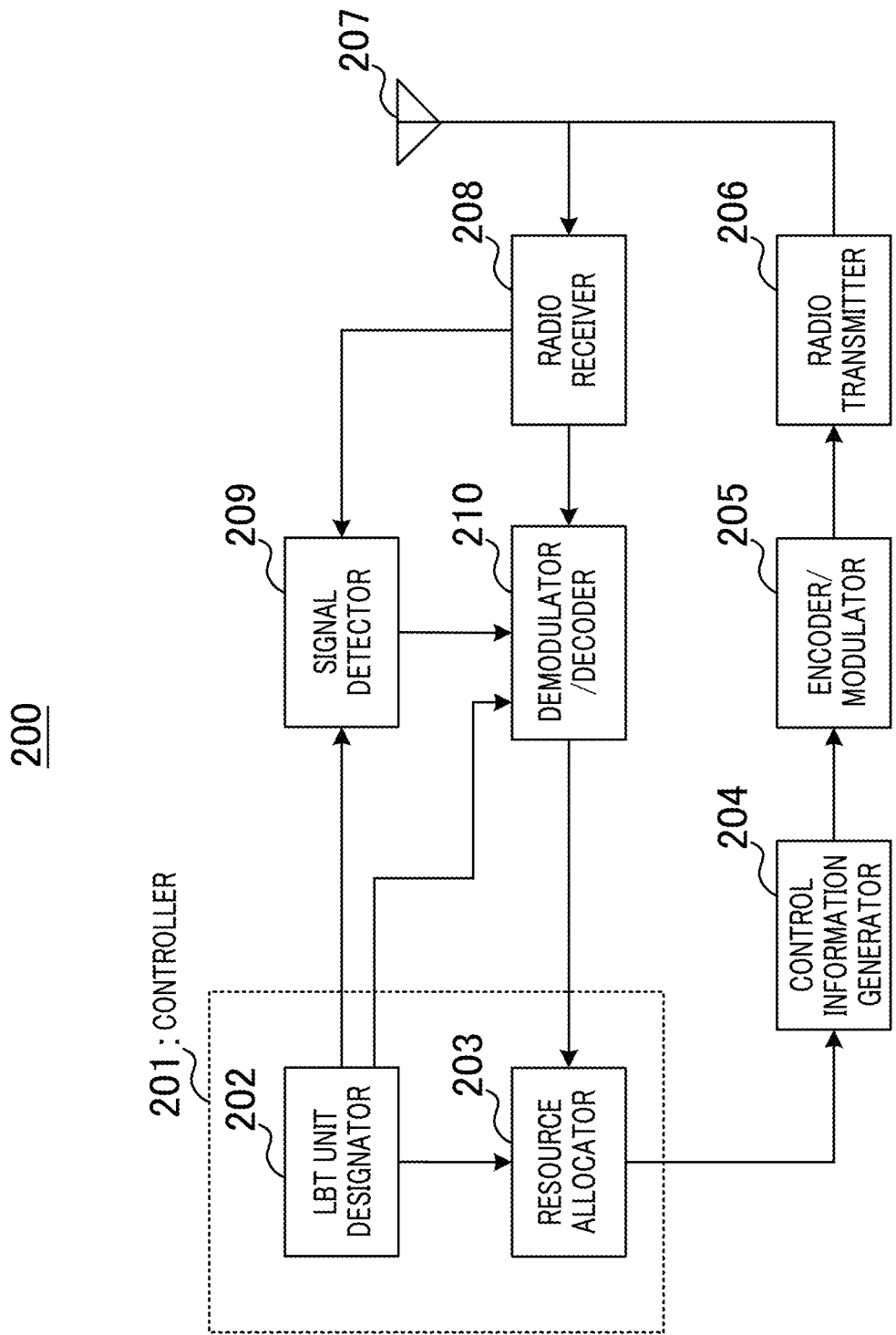
FIG. 6 is a block diagram illustrating the configuration of the base station according to Embodiment 1.

FIG. 6 is a block diagram illustrating the configuration of base station 200 according to the present embodiment. Base station 200 performs PUSCH scheduling for terminal 100.

In FIG. 6, base station 200 includes controller 201, control information generator 204, encoder/modulator 205, radio transmitter 206, antenna 207, radio receiver 208, and signal detector 209, and demodulator/decoder 210.

Controller 201 (for example, a scheduler) assigns, for example, a resource for uplink transmission (for example, the PUSCH resource in the unlicensed band) to terminal 100. Controller 201 includes, for example, LBT unit designator 202 and resource allocator 203.

LBT unit designator 202 derives an LBT unit (for example, the bandwidth or frequency place, etc.) to be set for terminal 100 on the basis of, for example, the interference power and the like received from other base stations and terminals (that is, other apparatuses) in other systems or in the same system and outputs information regarding the LBT unit (LBT unit information) to resource allocator 203, signal detector 209, and demodulator/decoder 210. Note that the LBT unit may be determined quasi-statically or dynamically or may be specified in the specification by system common information.

Resource allocator 203 determines the assignment of a PUSCH radio resource (a PUSCH resource) to terminal 100 on the basis of, for example, the quality information indicated by terminal 100 at a predetermined point in time, the decoding result (such as the presence or absence of an error) input from demodulator/decoder 210, or the LBT unit information input from LBT unit designator 202. For example, resource allocator 203 may determine the assignment of the PUSCH resource in consideration of retransmission control on the basis of the decoding result input from demodulator/decoder 210. In addition, for example, resource allocator 203 determines a resource to which the uplink data is assigned on a per LBT unit basis. Resource allocator 203 outputs, to control information generator 204, the information indicating the determined radio resource allocation and the LBT unit information.

Control information generator 204 generates control information on the basis of the information input from resource allocator 203. For example, control information generator 204 generates UL grant including DCI to be indicated to terminal 100 on the basis of the PUSCH resource allocation information. Furthermore, if the LBT unit set for terminal 100 is dynamically changed, control information generator 204 may set the LBT unit information in the UL grant. Control information generator 204 outputs the generated control information to encoder/modulator 205.

Encoder/modulator 205 modulates and encodes the control information (for example, UL grant) input from control information generator 204 and outputs the encoded signal to radio transmitter 206.

Radio transmitter 206 performs transmission processing, such as D/A conversion, up-conversion, and amplification, on the signal input from encoder/modulator 205 and transmits a radio signal obtained through the transmission processing from antenna 207 to terminal 100.

Radio receiver 208 performs reception processing, such as down-conversion and A/D conversion, on the signal received from terminal 100 via antenna 207 and outputs the signal obtained through the reception processing to signal detector 209 and demodulator/decoder 210.

Signal detector 209 detects a reception signal on a per LBT unit basis on the basis of the LBT unit information input from LBT unit designator 202. For example, signal detector 209 measures the reception signal power on a per LBT unit basis by using the reception signal input from radio receiver 208 and determines whether a reception signal exists in each of the LBT units. Note that the method for detecting the reception signal is not limited to the method for measuring the reception signal power. For example, a method for detecting the presence or absence of a signal by correlation processing between the DM-RS included in the reception signal and a replica signal of the DM-RS may be employed. Signal detector 209 outputs, to demodulator/decoder 210, information regarding the LBT unit in which a signal is detected (that is, the LBT unit having the LBT result being idle in terminal 100).

Demodulator/decoder 210 demodulates and decodes the reception signal input from radio receiver 208 with respect to the frequency resource corresponding to the LBT unit indicated in the information regarding the LBT unit input from signal detector 209 (that is, the LBT unit in which a signal was detected) among the LBT units set for terminal 100 and indicated in the LBT unit information input from LBT unit designator 202. Thereafter, demodulator/decoder 210 acquires the data from terminal 100. Note that by performing the decoding processing in units of LBT units in demodulator/decoder 210, base station 200 can receive data on a per LBT unit basis. Demodulator/decoder 210 outputs, to resource allocator 203, the data decoding result (success or decoding failure in decoding) on a per LBT unit basis.

[Operations Performed by Terminal 100 and Base Station 200]

The operations performed by terminal 100 and base station 200 having the above configurations are described in detail below.

Figure 7:
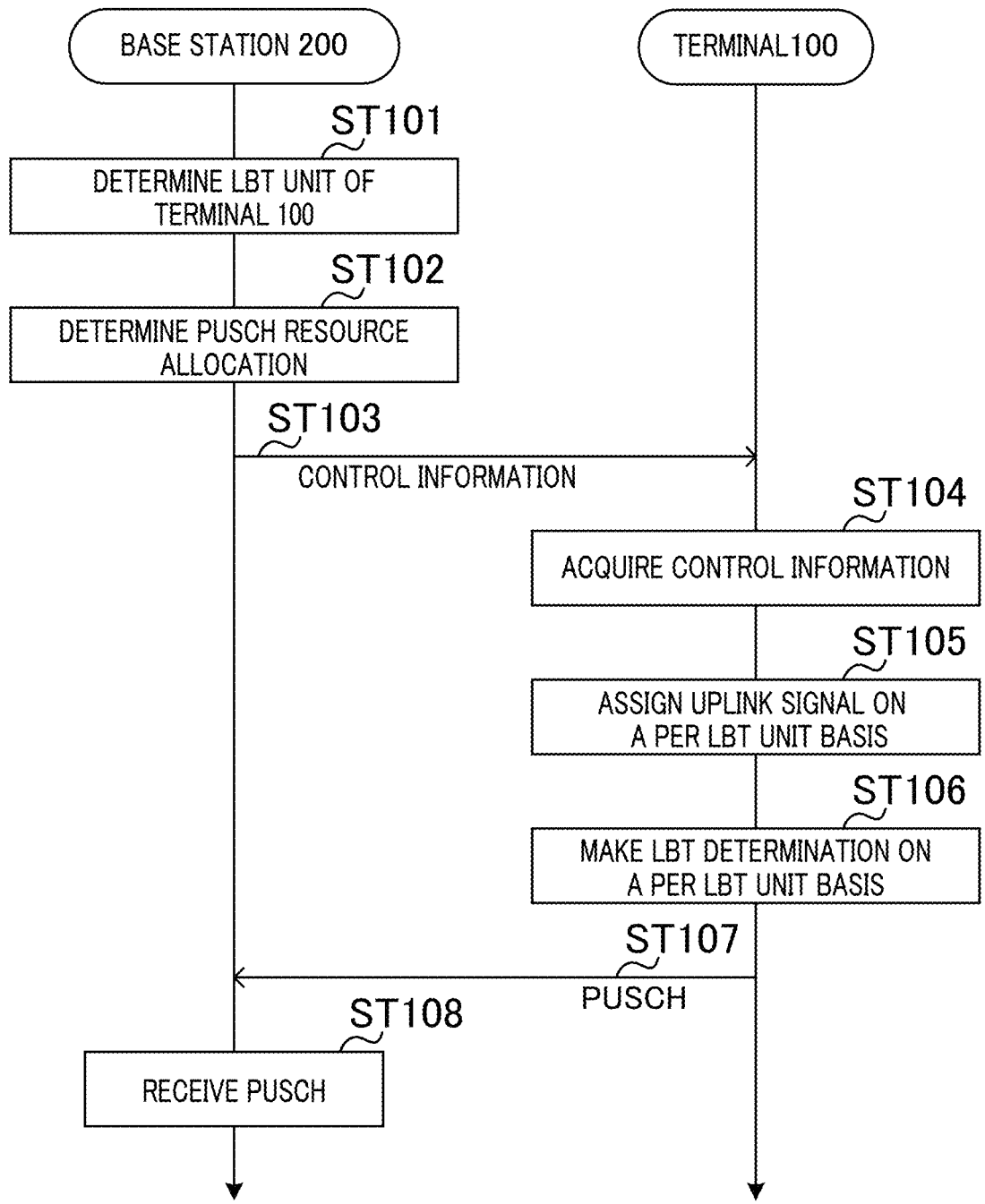
FIG. 7 is a sequence diagram illustrating an example of the operations performed by the terminal and base station according to Embodiment 1.

FIG. 7 is a sequence diagram illustrating the operation performed by terminal 100 (FIG. 5) and the operation performed by base station 200 (FIG. 6).

Base station 200 determines, for example, the LBT unit (for example, the band or frequency place) to be set for terminal 100 in the unlicensed band (ST101).

Base station 200 determines the assignment of an uplink radio resource (e.g., PUSCH resources) to terminal 100 (ST102). For example, base station 200 assigns an uplink signal (for example, uplink data or UCI) to each of the LBT units set for terminal 100.

Base station 200 transmits, to terminal 100, control information (for example, DCI included in the PDCCH) indicating the scheduling result of terminal 100 (ST103). The control information includes, for example, uplink resource allocation information. Furthermore, the control information may include, for example, information regarding the LBT unit. Terminal 100 acquires the control information transmitted from base station 200 (ST104) and identifies the uplink resource set for terminal 100 and the LBT unit for the uplink resource.

Terminal 100 assigns an uplink signal (for example, uplink data or UCI) to each of the identified LBT units (ST105). For example, terminal 100 assigns encoded data obtained by encoding the transmission data to a resource on a per LBT unit basis.

Terminal 100 makes LBT determination on a per LBT unit basis before transmitting the uplink signal (a PUSCH signal) (in, for example, a 25 us interval before PUSCH transmission) (ST106). Terminal 100 transmits, to base station 200, the uplink signal (for example, PUSCH) assigned to an LBT unit having LBT being idle (ST107). In contrast, terminal 100 discards the uplink signal assigned to the LBT unit having the LBT result being Busy.

Base station 200 receives the uplink signal (for example, PUSCH) transmitted from terminal 100 (ST108). For example, among the LBT units set for terminal 100, base station 200 receives the uplink signal in the LBT unit for which the LBT result is determined to be idle by terminal 100.

[Resource Allocation Method]

The resource allocation method for assigning a resource to the uplink signal in resource allocator 107 of terminal 100 and resource allocator 203 of base station 200 (for example, the processes in ST102 and ST105 illustrated in FIG. 7) is described in detail below.

Base station 200 determines a resource to be allocated to uplink data (for example, UL-SCH) for terminal 100 on a per LBT unit basis. In addition, terminal 100 assigns encoded data (encode data) of uplink data on a per LBT unit basis.

Figure 8:
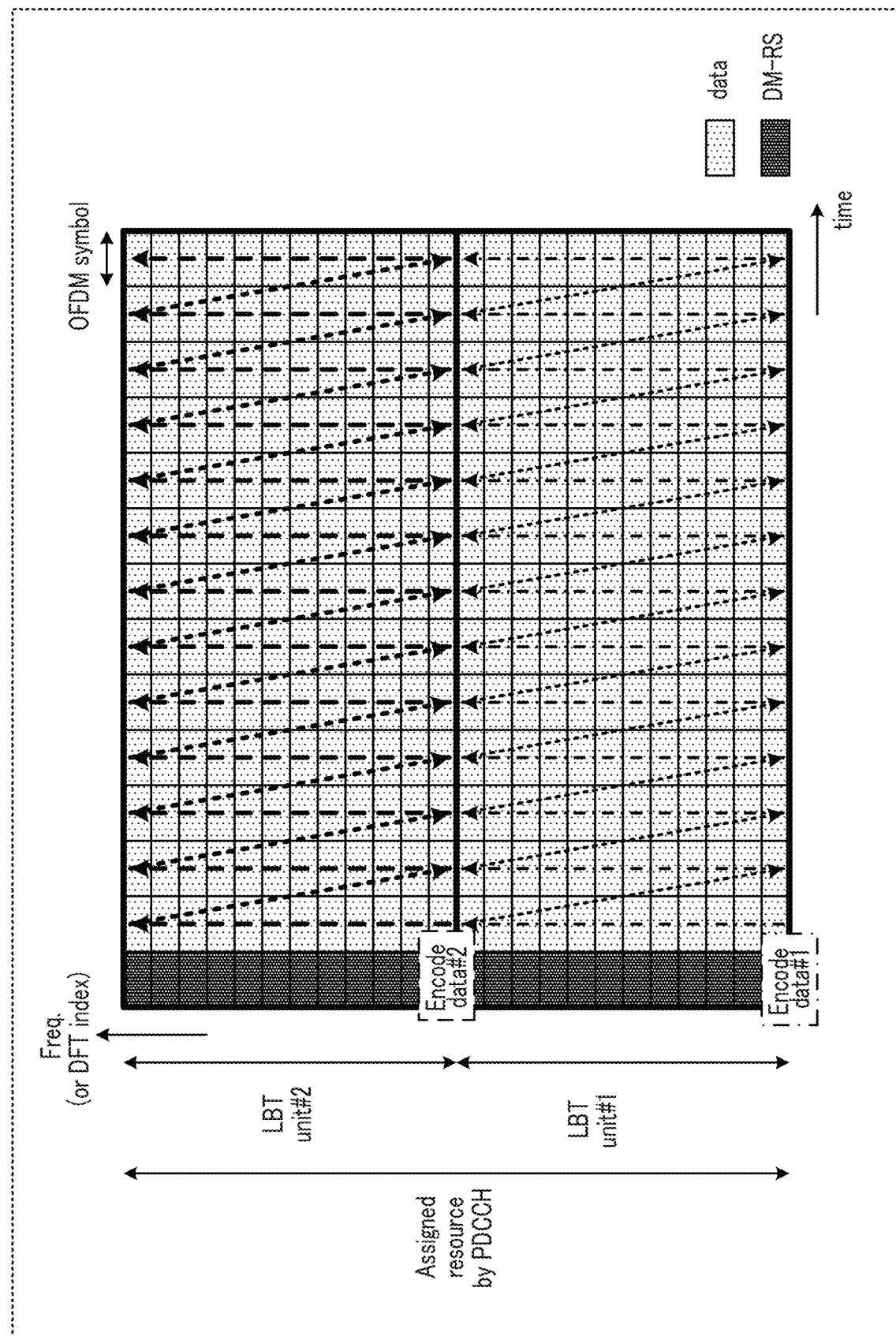
FIG. 8 illustrates an example of resource allocation according to Embodiment 1.

FIG. 8 illustrates an example of resource allocation according to the present embodiment.

In FIG. 8, a radio resource allocated to terminal 100 by the PDCCH (an allocated resource) constitutes two LBT units (LBT unit #1 and LBT unit #2).

For example, in FIG. 8, terminal 100 generates two different pieces of encoded data (Encode data #1 and Encode data #2). As illustrated in FIG. 8, terminal 100 assigns Encode data #1 to the resources of LBT unit #1 and assigns Encode data #2 to the resources of LBT unit #2. That is, in terminal 100, the uplink data (for example, UL-SCH) is encoded such that pieces of data each to be assigned to one of the LBT units are encoded, as illustrated in FIG. 8.

As illustrated in FIG. 8, in the case where the PUSCH transmission method is OFDM transmission, in the frequency domain and the time domain, each piece of encoded data is sequentially assigned to the resources such that OFDM symbols are sequentially allocated to the frequency domains of the LBT units, from the first OFDM symbol (for example, the OFDM symbol next to the OFDM symbol to which DM-RS is mapped) in the frequency direction (in the direction in which the frequency increases or decreases).

Of the uplink data transmitted in PUSCH, the data (encoded data) assigned to each LBT unit is mapped to the resource of the LBT unit first in the frequency domain and second in the time domain (for example, Frequency first mapping).

For example, in FIG. 8, in terms of LBT unit #1, Encode data #1 is assigned to the resource such that the OFDM symbols are sequentially allocated to the resource in order from the lowest frequency to the highest frequency (for example, in the order denoted by an alternate long and short dash line arrow), beginning with the first OFDM symbol (the second symbol). Similarly, in FIG. 8, in terms of LBT unit #2, Encode data #2 is assigned to the resource in order from the lowest frequency to the highest frequency (e.g., in the order denoted by a dashed line arrow), beginning with the first OFDM symbol (the second symbol).

Furthermore, as illustrated in FIG. 8, in the case where the PUSCH transmission method is DFT-S-OFDM transmission, in the DFT index (that is, the DFT domain) and the time domain before DFT is performed (also referred to as "pre-DFT"), each piece of encoded data is assigned to the resources in the DFT domain of one of the LBT units such that the OFDM symbols are sequentially allocated to the resource towards the DFT index (in descending or ascending order of the index), beginning with the first OFDM symbol.

Of the uplink data transmitted in PUSCH, pieces of data (encoded data) assigned to LBT units are mapped to the resources of the LBT units first in the DFT domain and second in the time domain.

Note that in the case of DFT-S-OFDM transmission, terminal 100 does not perform DFT in the size of the band to which the resource is allocated (the allocated resource in FIG. 8), but performs DFT processing for each LBT unit and performs conversion into a signal in the frequency domain.

In this way, if a plurality pieces of coded data exist, terminal 100 assigns each piece of coded data to one of different LBT units. That is, terminal 100 assigns uplink data (encoded data) in units of LBT units. As a result, even if the LBT result of some of LBT units is busy, terminal 100 can transmit all the data bits of the encoded data assigned to the resource of another LBT unit.

For example, if, in FIG. 8, LBT unit #1 is determined to be Busy and LBT unit #2 is determined to be idle, all the data bits of Encode data #2 assigned to the resource of LBT unit #2 are transmitted to base station 200, although Encode data #1 is discarded and is not transmitted. Note that the same applies to the case where LBT unit #1 is determined to be idle and LBT unit #2 is determined to be Busy.

In addition, for example, in FIG. 8, by using the signal transmitted from terminal 100, base station 200 determines that out of the LBT unit #1 and LBT unit #2 set for terminal 100, the LBT unit in which a signal is detected is an LBT unit having the LBT result being idle at terminal 100 and determines that the LBT unit in which no signal is detected is an LBT unit having the LBT result being Busy at terminal 100. Thereafter, base station 200 demodulates and decodes the signal received in the LBT unit # having the LBT result being idle and acquires the reception data.

As described above, according to the present embodiment, base station 200 determines the resource to which the uplink data is to be assigned for each of a plurality of LBT units obtained by dividing the predetermined frequency band allocated to terminal 100. In addition, terminal 100 assigns uplink data to each of a plurality of LBT units obtained by dividing a predetermined frequency band allocated to terminal 100.

As a result, depending on the reception quality of each LBT unit in the unlicensed band, base station 200 can normally (that is, without error) receive part of encoded data (encoded data sent from an LBT unit having the LBT result being idle) in the first transmission and, thus, an increase in delay or a decrease in throughput in data transmission and reception can be prevented.

As described above, according to the present embodiment, terminal 100 can appropriately transmit uplink data (for example, UL-SCH) in the unlicensed band without degrading system performance.

Although FIG. 8 illustrates the case where the number of LBT units and the number of pieces of the encoded data are two each, the number of LBT units and the number of pieces of encoded data are not limited to two, and may be three or more.

In addition, although FIG. 8 illustrates the case where the number of LBT units and the number of pieces of encoded data are the same, the number of LBT units and the number of pieces of encoded data may be different. For example, the present embodiment is applicable even when the number of LBT units is less than the number of pieces of encoded data. For example, if the number of LBT units is 2 (for example, LBT unit #1 and LBT unit #2) and the number of pieces of encoded data is 4 (for example, Encode data #1, #2, #3 and #4), encode data #1 and #2 may be assigned to LBT unit #1, and encode data #3 and #4 may be assigned to LBT unit #2. Alternatively, any three pieces of encoded data out of encode data #1 to #4 may be assigned to LBT unit #1, and the remaining one piece of encoded data may be assigned to LBT unit #2.

In addition, although FIG. 8 illustrates the case where the sizes of the pieces of encoded data (Encode data #1 and #2) are the same, the sizes of the pieces of encoded data may be different.

Figure 9:
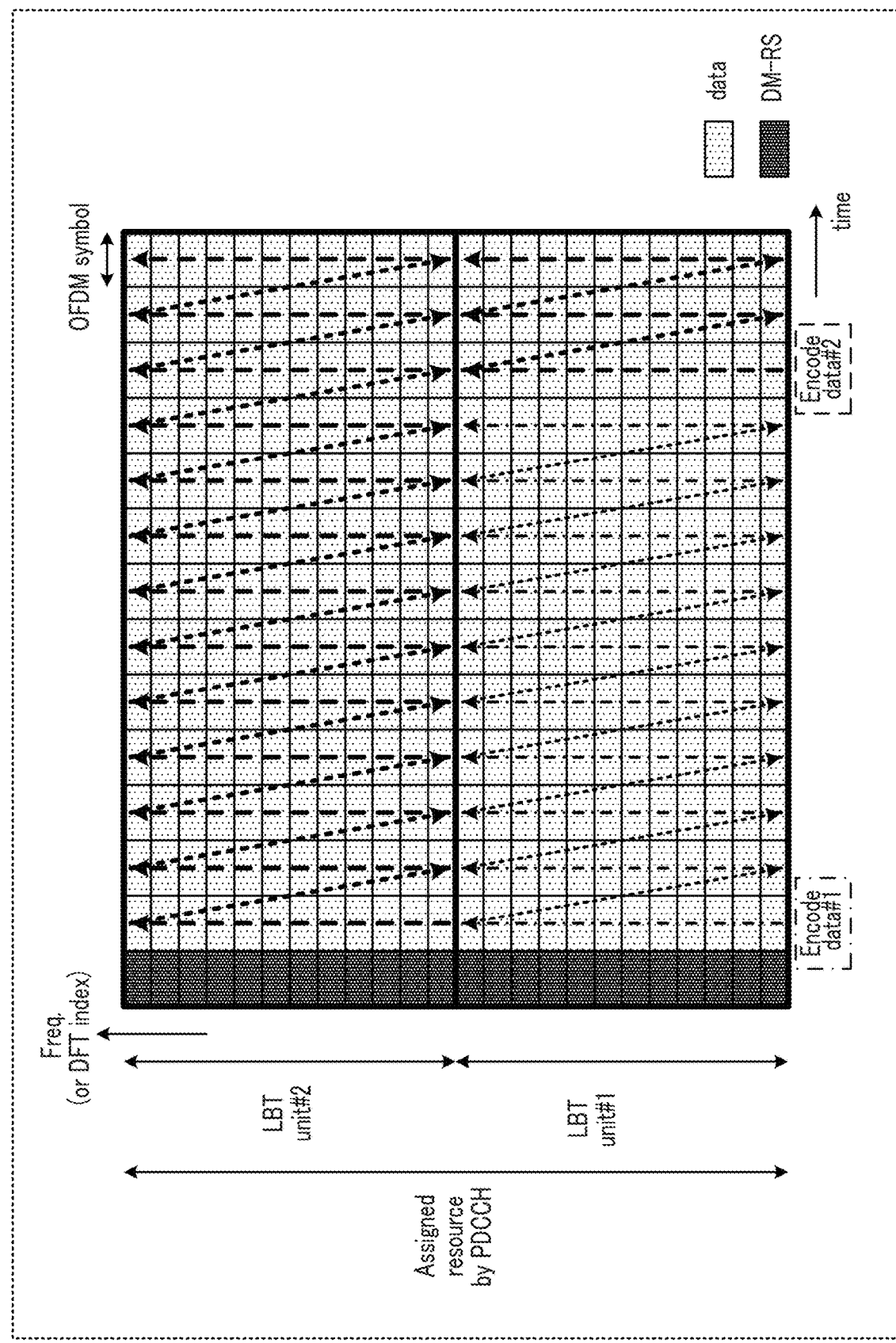
FIG. 9 illustrates another example of resource allocation according to Embodiment 1.

For example, FIG. 9 illustrates an example of resource allocation when the size of Encode data #2 is larger than the size of Encode data #1. In FIG. 9, for example, the first piece of encoded data (Encode data #1) is assigned to LBT unit #1 (the second to eleventh OFDM symbols in FIG. 9). After assignment of Encode data #1 is completed, another piece of encoded data (Encode data #2) may be assigned to the LBT unit #1 that is the same as the LBT unit to which Encode data #1 was assigned. After the frequency and time resources of the LBT unit #1 are all used, the remaining pieces of encoded data may be assigned to a different LBT unit, that is, LBT unit #2.

In the case illustrated in FIG. 9, part of Encode data #2 is transmitted across a plurality of LBT units, as in the case illustrated in FIG. 2, for example. However, as illustrated in FIG. 9, of the Encode data #2, the encoded data transmitted using the LBT unit #1 is less than the encoded data transmitted using the LBT unit #2. That is, in FIG. 9, the ratio of the encoded data transmitted across the plurality of LBT units to the entire Encode data #2 is smaller than that in the case illustrated in FIG. 2. For this reason, for example, depending on the reception quality, even when the LBT of the LBT unit #1 illustrated in FIG. 9 is Busy (even when the signal of the LBT unit #1 is discarded), it is highly likely that Encode data #2 is correctly received by base station 200 in the first transmission.

Note that in FIG. 9, the case is described where Encode data #2 is assigned to the symbol in the middle of LBT unit #1 (the symbol subsequent to Encode data #1) and the subsequent symbols in succession. However, the assignment start position of Encode data #2 is not limited to that illustrated in FIG. 9. For example, Encode data #2 may be assigned to LBT unit #2 and the subsequent LBT units in succession.

Furthermore, according to the present embodiment, the term "encoded data" is defined by, for example, any of the following.

(1) CBG (Code Block Group)

A CB (Code Block) is a unit to perform encoding (for example, LDPC (Low Density Parity Check) coding). The transmission data is divided into a plurality of blocks (for example, CBs) in accordance with the data size and is encoded in units of blocks. A CBG is a unit of a plurality of CBs that are grouped. For example, retransmission control can be performed in units of CBGs. Therefore, in terminal 100 and base station 200, transmission data (that is, encoded data) may be assigned in units of CBGs. In this case, as described above, even if the LBT result of a subset of the LBT units is Busy, all data in a CBG is transmitted by another LBT unit (that is, an LBT unit in an idle mode). Therefore, depending on the reception quality, base station 200 can normally receive the data in the first transmission. That is, it can be prevented that part of data in a CBG is transmitted and, thus, the data is not normally received in the first transmission. As a result, an increase in delay in data transmission and reception or a decrease in throughput can be prevented.

(2) Unit of Repetition

Figure 10:
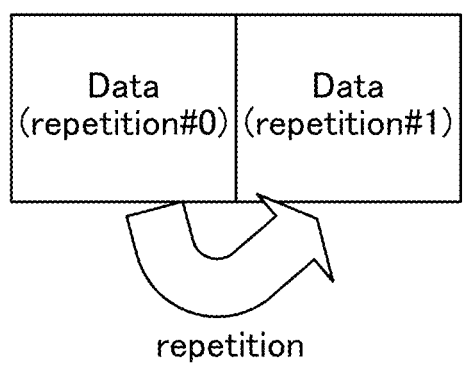
FIG. 10 illustrates an example of data repetition.

As illustrated in FIG. 10, when data is repeatedly transmitted a plurality of times (twice in FIG. 10) (that is, when Repetition is applied), each piece of the repetition data (repetition #0 and repetition #1 in FIG. 10) may be assigned on a per LBT unit basis in terminal 100 and base station 200. The pieces of repetition data are the same. Accordingly, for example, even if the LBT result of a subset of the LBT units is Busy, another piece of repetition data is transmitted by assigning the piece of repetition data to a different LBT unit. Therefore, depending on the reception quality, base station 200 can normally receive the data in the first transmission. As a result, an increase in delay in data transmission and reception or a decrease in throughput can be prevented.

(3) Transport Block

Transport Block is a unit of a plurality of CBGs that are grouped. In terminal 100 and base station 200, transmission data (that is, encoded data) may be assigned on a per LBT unit basis in units of Transport Blocks. As a result, even if the LBT result of a subset of the LBT units is Busy, all the data in a TB including a plurality of CBGs is transmitted using another LBT unit (that is, an LBT unit in the idle mode). As a result, the same effect as in the case of a unit of CBGs described above can be obtained.

Embodiment 2

Embodiment 1 has been described with reference to transmission of uplink data (for example, UL-SCH). In contrast, according to the present embodiment, transmission of uplink control information (for example, UCI) is described.

[UCI Transmission Method in NR Licensed Band]

In the NR license band, if the timing of PUSCH transmission overlaps with the timing of uplink control channel (PUCCH: Physical Uplink Control Channel) transmission including UCI, the terminal can transmit UCI and data in PUSCH in a multiplexed manner, instead of transmitting UCI in PUCCH (refer to, for example, NPL 5).

As UCI, for example, the following at least three types of information are prescribed: "HARQ-ACK" (also referred to as "ACK/NACK"), which is a response signal to downlink data (for example, PDSCH: Physical Downlink Shared Channel), CSI part 1, which is one type of the Channel state Information, and CSI part 2, which is another type of CSI.

Figure 11:
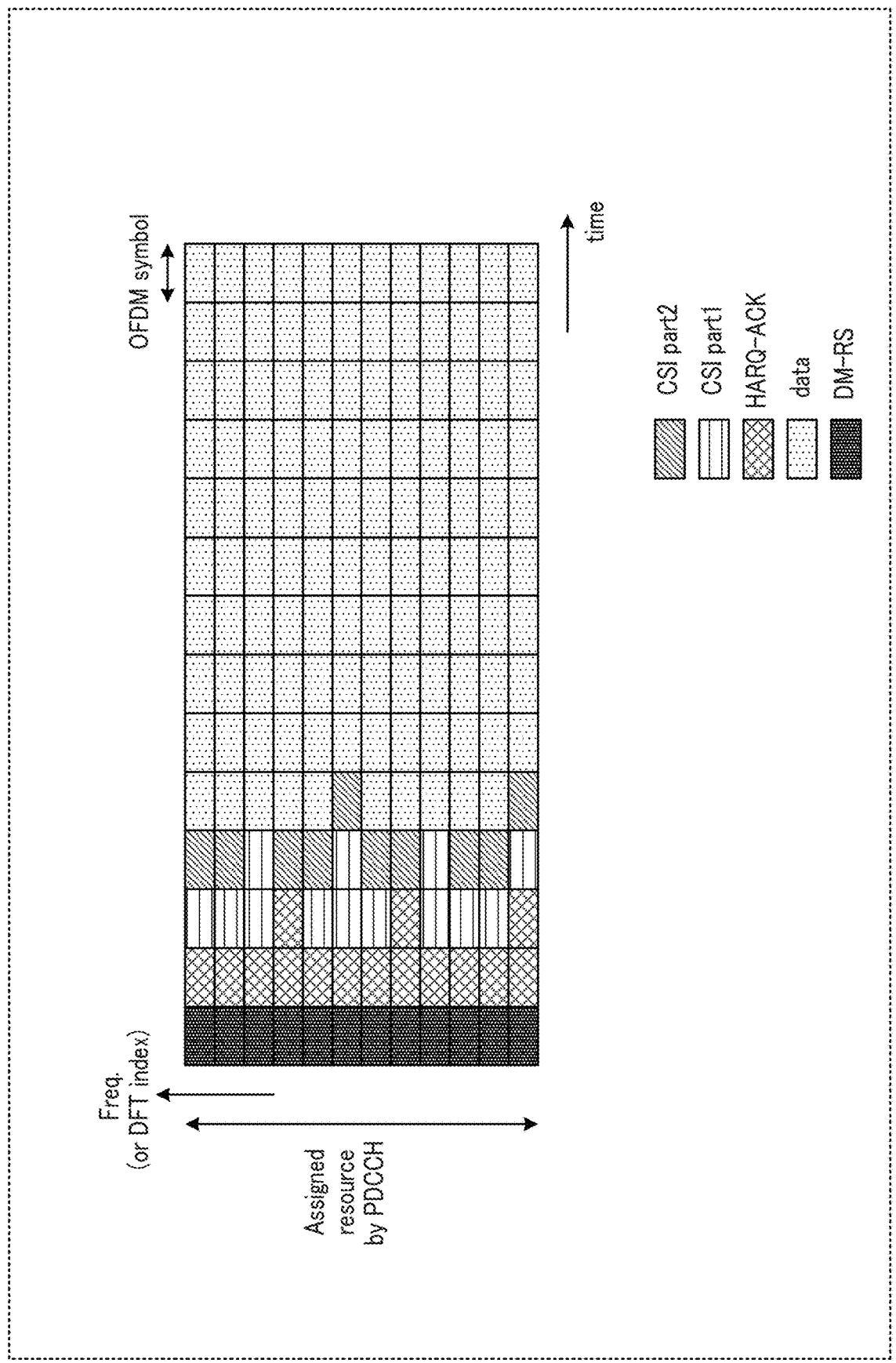
FIG. 11 illustrates an example of resource allocation in the case of transmitting UCI by using PUSCH in a license band.

FIG. 11 illustrates an example of UCI resource allocation in the case where uplink data (data) and UCI (HARQ-ACK, CSI part1, and CSI part2) are transmitted in PUSCH in a multiplexed manner. As illustrated in FIG. 11, in terms of UCI, the OFDM symbol (the second symbol in FIG. 11) following the OFDM symbol to which DM-RS is mapped (the first symbol in FIG. 11) and the subsequent symbols are allocated to the resource, in the order of HARQ-ACK, CSI-part1, and CSI part2.

In addition, as illustrated in FIG. 11, in order to obtain the frequency diversity gain, the UCIs are evenly arranged (that is, distributedly arranged) in the band (the allocated resource) in which the PUSCH is transmitted.

In addition, in FIG. 11, the data is rate matched or punctured in accordance with the type and size of UCI to be assigned.

The UCI transmission method in the NR licensed band has been described above.

Figure 12:
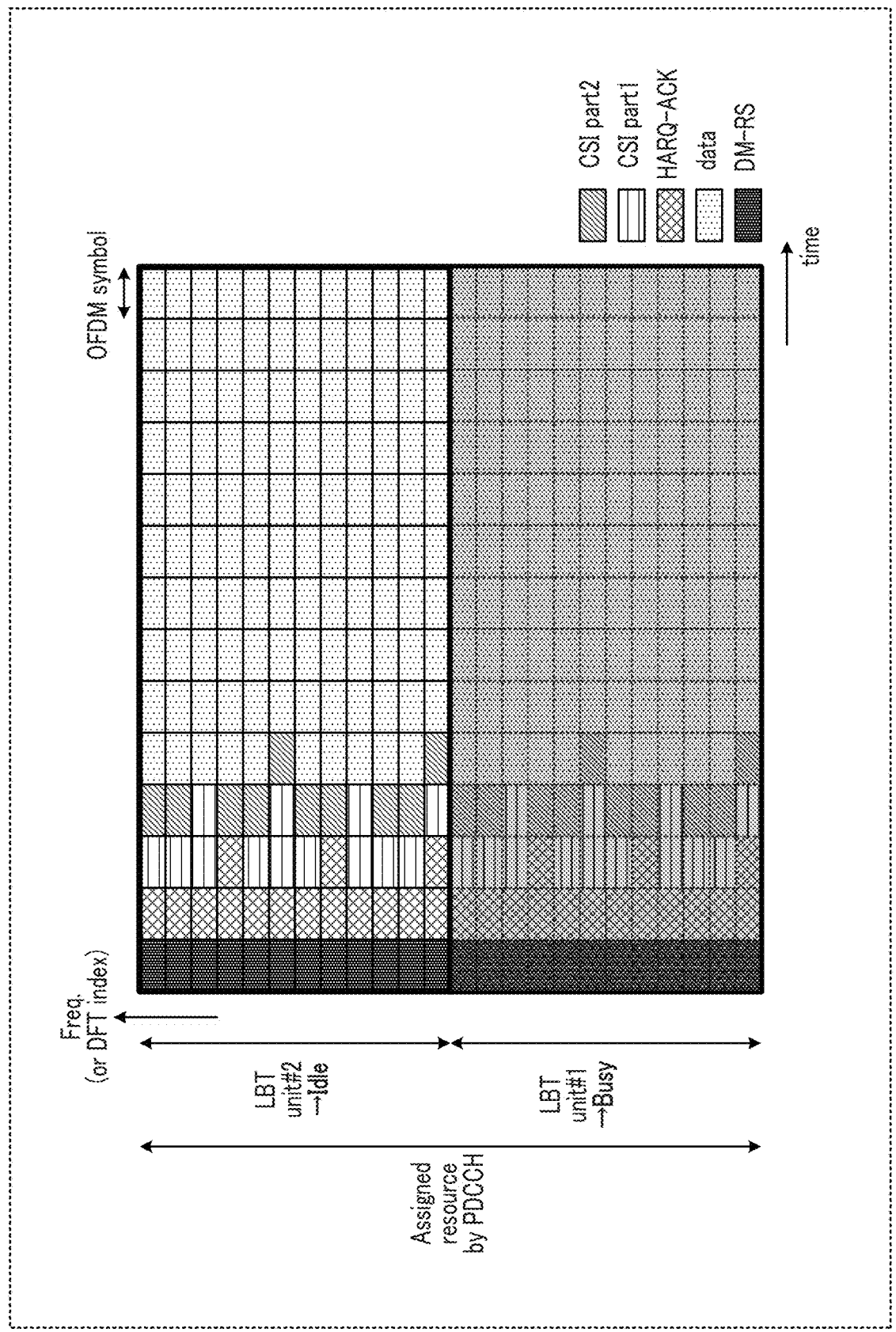
FIG. 12 illustrates an example of resource allocation in the case of transmitting UCI by using PUSCH in a license band.

As described in Embodiment 1, in the NR unlicensed band, for example, as illustrated in FIG. 12, a plurality of LBT units (LBT unit #1 and LBT unit #2 in FIG. 12) may exist in the PUSCH resource (the allocated resource) allocated by the PDCCH.

In this case, if the LBT result of a subset of the LBT units is Busy, the terminal cannot transmit a signal in the band corresponding to the LBT unit. Therefore, when the terminal transmits UCI and data in PUSCH in a multiplexed manner, the UCI cannot be transmitted in the band corresponding to the LBT unit having the LBT result being Busy.

Unlike data, HARQ cannot be applied to UCI (for example, HARQ-ACK and CSI part1 etc.). In addition, UCI is a signal that is more important than data. Therefore, if UCI transmission/reception fails, it has a large impact on the system performance (for example, throughput or delay).

For this reason, according to the present embodiment, a UCI resource allocation method is described below that increases the UCI transmission probability even when the LBT result of a subset of the LBT units is busy.

A communication system according to the present embodiment includes terminal 300 (refer to FIG. 13 described later) and base station 400 (refer to FIG. 14 described later).

Figure 13:
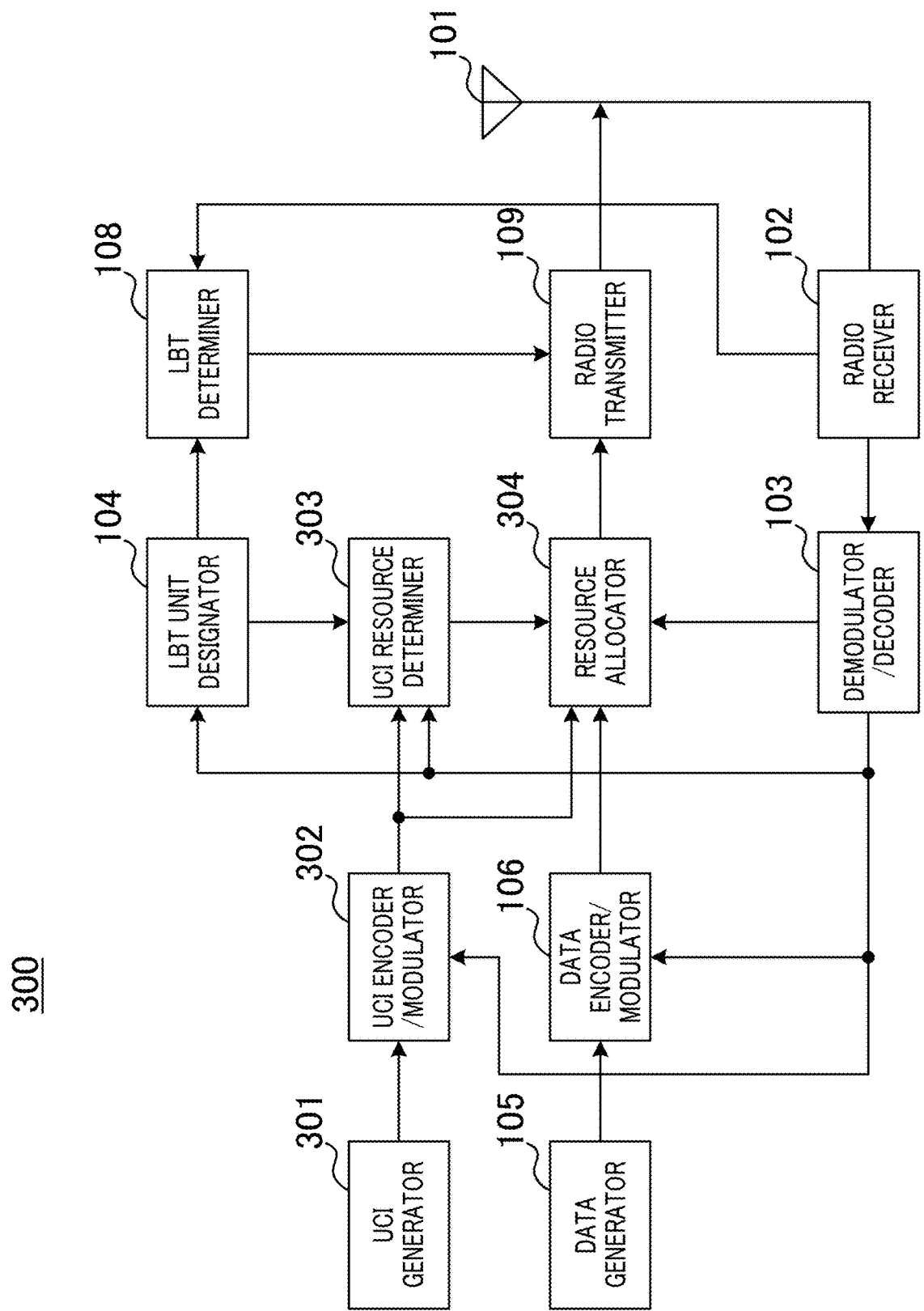
FIG. 13 is a block diagram illustrating the configuration of a terminal according to Embodiment 2.

FIG. 13 is a block diagram illustrating the configuration of terminal 300 according to the present embodiment. Note that the same reference numerals are used in FIG. 13 to describe those configurations that are identical to the configurations of terminal 100 according to Embodiment 1 (FIG. 5), and description of the configurations is not provided.

More specifically, unlike terminal 100, terminal 300 illustrated in FIG. 13 is newly provided with UCI generator 301, UCI encoder/modulator 302, and UCI resource determiner 303, and the operation performed by resource allocator 304 is different from that in terminal 100.

UCI generator 301 generates UCI (for example, at least one of HARQ-ACK, CSI part1, and CSI part2) to be transmitted by terminal 300 and outputs the generated UCI to UCI encoder/modulator 302.

UCI encoder/modulator 302 encodes and modulates the UCI input from UCI generator 301 by using the control information input from demodulator/decoder 103. For example, when UCI encoder/modulator 302 transmits a plurality of UCI types (for example, HARQ-ACK, CSI part1 or CSI part2), UCI encoder/modulator 302 encodes the UCI on a per UCI type basis.

The UCI encoding method may be changed in accordance with the number of UCI bits. For example, if the number of UCI bits is less than or equal to 11 bits, the Block code may be applied. However, if the number of UCI bits is more than 11 bits, the Polar code may be applied.

In addition, in NR, when HARQ-ACK is transmitted in PUSCH, the bit size after encoding of HARQ-ACK is determined in accordance with the following expression 1 (refer to, for example, NPL 5).

(Expression 1)

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{SC}^{UCI}(l) \right\rceil \right\} \quad [1]$$

In expression 1, $Q'_{ACK}$ denotes the number of REs (Resource Elements) of HARQ-ACK after encoding, $O_{ACK}$ denotes the number of bits of HARQ-ACK, $L_{ACK}$ denotes the number of CRC (Cyclic Redundancy Check) bits, $\beta_{offset}^{PUSCH}$ denotes the correction coefficient (the parameter) of the code rate of HARQ-ACK for the data (UL-SCH), $N_{symb,all}^{PUSCH}$ denotes the number of PUSCH symbols, $\Sigma M_{SV}^{UCI}(l)$ (l=0 to ($N_{symb,all}^{PUSCH}-1$)) denotes the total resource size (the number of REs) of PUSCH, and $\Sigma K_r$ (r=0 to $C_{UL-SCH}-1$) denotes the number of bits of data (UL-SCH) to be transmitted by PUSCH. In addition, $\alpha$ denotes the ratio of the number of REs of UCI (HARQ-ACK) transmitted by PUSCH. That is, $\alpha$ is a parameter that determines the upper limit of the number of REs of UCI in order to ensure the quality of data (UL-SCH).

UCI encoder/modulator 302 outputs the modulated UCI to resource allocator 304. In addition, UCI encoder/modulator 302 outputs, to UCI resource determiner 303, information indicating the number of REs of the encoded UCI calculated in the encoding process, for example.

UCI resource determiner 303 determines the resource to which the UCI is assigned on the basis of the control information input from demodulator/decoder 103, the LBT unit information input from LBT unit designator 104, and the information indicating the number of REs of the encoded UCI input from UCI encoder/modulator 302. UCI resource determiner 303 outputs the resource allocation information regarding the UCI to resource allocator 304. Note that the details of the UCI resource determination method for use by UCI resource determiner 303 are described later.

Resource allocator 304 assigns the data input from data encoder/modulator 106 and the UCI input from UCI encoder/modulator 302 to the frequency resource and the time resource on the basis of the control information input from demodulator/decoder 103 and the resource allocation information regarding the UCI input from UCI resource determiner 303. Resource allocator 304 outputs, to radio transmitter 109, the uplink signal including the data and the UCI after resource allocation (or sometimes including the reference signal).

Figure 14:
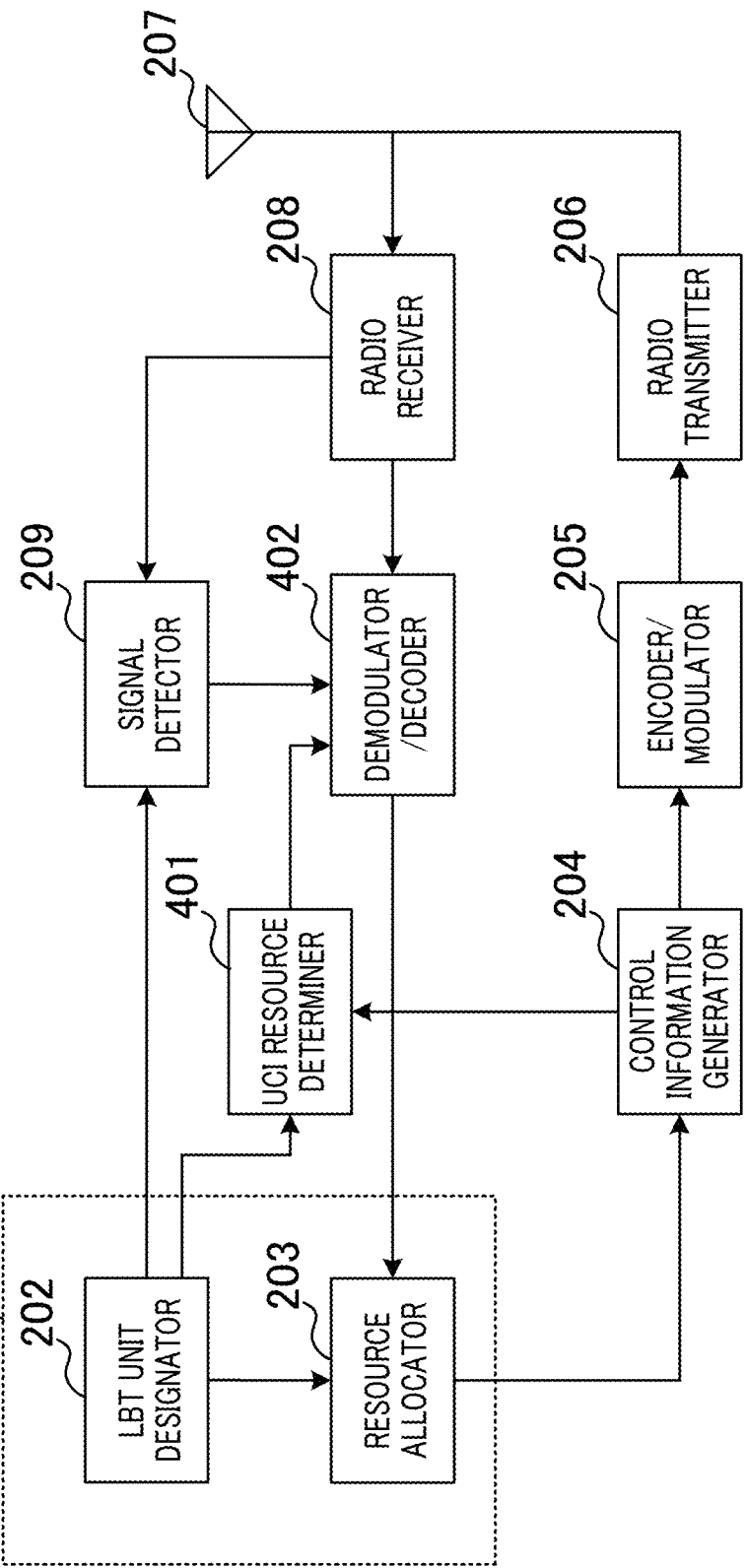
FIG. 14 is a block diagram illustrating the configuration of a base station according to Embodiment 2.

Subsequently, FIG. 14 is a block diagram illustrating the configuration of base station 400 according to the present embodiment. Note that the same reference numerals are used in FIG. 14 to describe those configurations that are identical to the configurations of base station 200 according to Embodiment 1 (FIG. 6), and description of the configurations is not provided.

More specifically, unlike base station 200, base station 400 illustrated in FIG. 14 is newly provided with UCI resource determiner 401, and the operation performed by demodulator/decoder 402 is different from that in base station 200.

UCI resource determiner 401 deduces the resource to which terminal 300 assigns UCI and data on the basis of the control information input from control information generator 204 and the LBT unit information input from LBT unit designator 202. Thereafter, UCI resource determiner 401 outputs, to demodulator/decoder 402, the deduced data and the resource allocation information indicating the UCI resource. Note that the operation performed by UCI resource determiner 401 is the same as the operation performed by UCI resource determiner 303 (refer to FIG. 13) of terminal 300.

Demodulator/decoder 402 demodulates and decodes the reception signal input from radio receiver 208 in terms of the frequency resource of the LBT unit indicated in the information input from signal detector 209 (that is, the LBT unit in which the signal was detected) on the basis of the UCI resource allocation information input from UCI resource determiner 401 and obtains the data and UCI from terminal 300.

[UCI Resource Allocation Method]

The resource allocation method for the UCI in UCI resource determiner 303 of terminal 300 and UCI resource determiner 401 of base station 400 is described in detail below.

Resource determination methods 1, 2 and 3 for UCI is described below.

<Resource Determination Method 1>

Resource determination method 1 is a method for determining the LBT unit to which UCI is assigned in accordance with the UCI type (for example, HARQ-ACK, CSI part1, and CSI part2, etc.).

For example, base station 400 determines the resource to which the UCI is assigned on a per LBT unit basis in accordance with the UCI type. In addition, terminal 300 assigns the UCI to each of the LBT units in accordance with the UCI type.

For example, among the plurality of LBT units set in terminal 300, the LBT unit to which each type of UCI is assigned (for example, LBT unit number: LBTUnitNo) is calculated in accordance with the following expression 2.

LBTUnitNoHARQ-ACK=mod($X$,numLBTUnit)

LBTUnitNoCSI_part1=mod($Y$,numLBTUnit)

LBTUnitNoCSI_part2=mod($Z$,numLBTUnit)  (Expression 2)

In expression 2, LBTUnitNoHARQ-ACK, LBTUnitNoCSI_part1, and LBTUnitNoCSI_part2 denote any of the LBT unit numbers (Index) in the band allocated to the PUSCH resource. In addition, numLBTUnit denotes the number of LBT units in the band to which the PUSCH resource is allocated. The function mod(a, b) is a modulo function that returns the remainder when a is divided by b.

In addition, the values of X, Y, and Z are parameters that determine the LBT Unit to which each type of UCI is assigned. The values of X, Y and Z may be indicated to terminal 300 by, for example, DCI or quasi-static indication information. Alternatively, the values of X, Y and Z may be system common information prescribed by the specification.

Furthermore, as the UCI resource allocation method in each of the LBT units, the same assignment method as the assignment method in the unlicensed band of NR (refer to, for example, FIG. 11) may be applied, or a different assignment method may be applied, for example.

Figure 15:
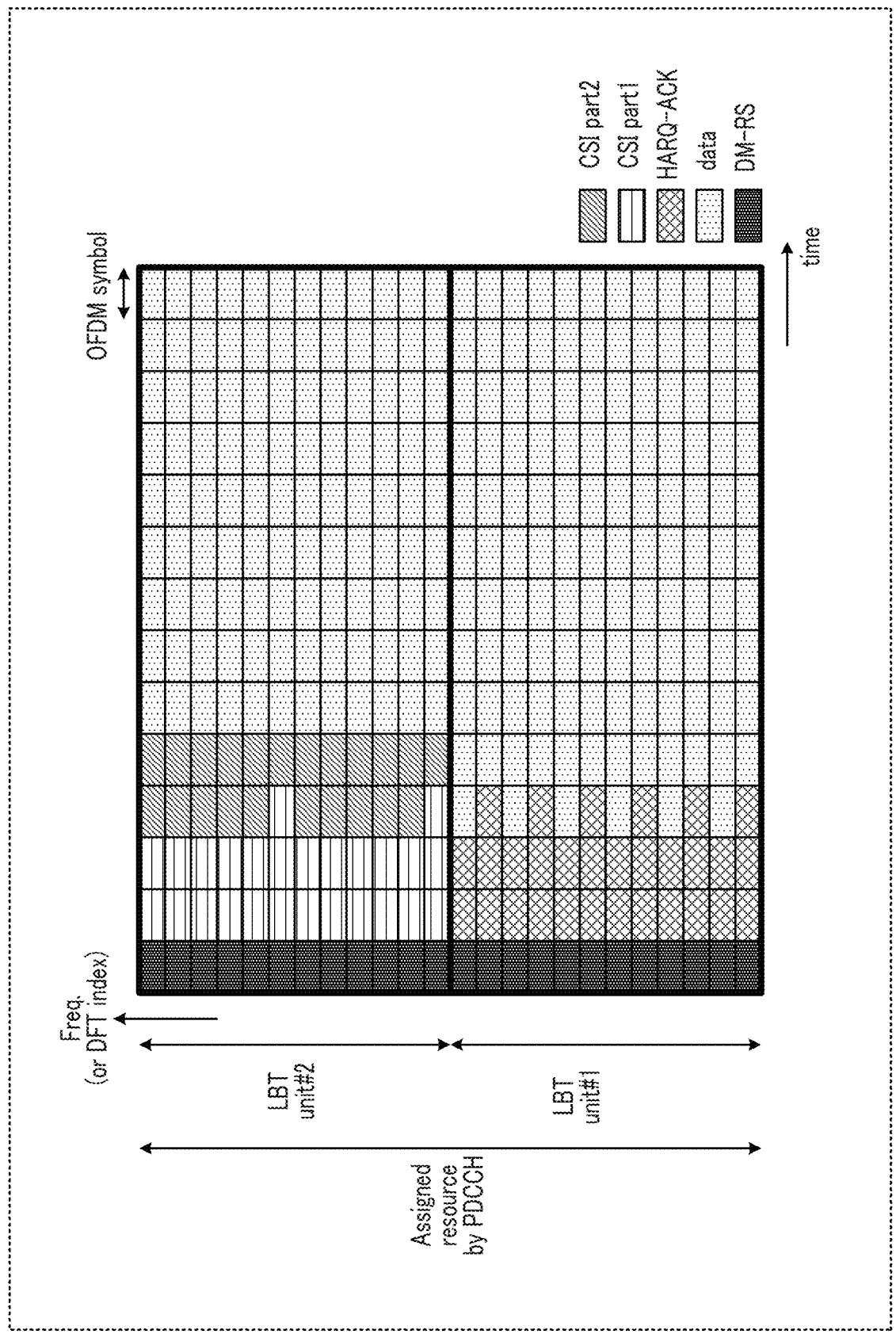
FIG. 15 illustrates an example of resource allocation according to resource determination method 1 of Embodiment 2.

FIG. 15 illustrates an example of resource allocation in resource determination method 1.

In FIG. 15, the radio resource (the allocated resource) allocated to terminal 300 by the PDCCH constitute two LBT units (LBT unit #1 and LBT unit #2). Therefore, numLBTUnit=2 in expression 2. Furthermore, FIG. 15 illustrates, as an example, the case of X=1, Y=2, and Z=2 in expression 2.

According to expression 2, LBTUnitN$_{OHARQ-ACK}$=1, LBTUnitN$_{OSCI\_part1}$=2, and LBTUnitN$_{OSCI\_part2}$=2. That is, as illustrated in FIG. 15, HARQ-ACK is assigned to the resource of LBT unit #1, CSI part1 is assigned to the resource of LBT unit #2, and CSI part2 is assigned to the resource of LBT unit #2.

In this way, when a plurality of LBT units are set in the PUSCH resource, terminal 300 determines the LBT unit (for example, the LBT unit number) to which the UCI is assigned on a per UCI type basis. That is, terminal 300 assigns each type of UCI to one of the LBT units. As a result, even if the LBT result of a subset of the LBT units is busy, terminal 300 can transmit all the information regarding the UCI assigned to the resources of other LBT units without part of information being punctured.

For example, in FIG. 15, when LBT unit #1 is determined to be Busy and LBT unit #2 is determined to be idle, HARQ-ACK is discarded and is not transmitted. However, all of the CSI part1 and CSI part2 assigned to the resource of LBT unit #2 are transmitted to base station 400. Note that the same applies when LBT unit #1 is determined to be idle and LBT unit #2 is determined to be Busy.

As a result, degradation of system performance (for example, the throughput or delay) due to non-transmission of UCI in each of the LBT units in the unlicensed band can be prevented.

Note that if CSI part1 is not transmitted and CSI part2 is transmitted, base station 400 may not be able to correctly interpret the uplink control information indicated from terminal 300. For example, the case where CSI part1 contains rank information and CSI part2 contains control information based on the rank information may occur. In this case, for example, let Y=Z in expression 2. In this manner, terminal 300 can assign the same LBT unit resource to CSI part1 and CSI part2. Consequently, the occurrence of the case where CSI part1 is not transmitted and CSI part2 is transmitted can be prevented. As a result, base station 400 can correctly interpret the information contained in the CSI part 2.

<Resource Determination Method 2>

Resource determination method 2 is a method for replicating information of at least one type of UCI (for example, HARQ-ACK, CSI part1 and CSI part2, etc.) transmitted from terminal 300 and assigning the information to a plurality of LBT units.

For example, terminal 300 assigns UCI to the resource of one of the LBT units in the band to which the PUSCH resource is allocated. Terminal 300 copies the UCI assigned to the resource of the one LBT unit for into all the LBT units in the band to which the PUSCH resource is allocated. Note that the candidates of the UCI type to be copied are as follows:

(i) All UCI types (for example, HARQ-ACK, CSI part1, and CSI part2), (ii) HARQ-ACK (that is, CSI part1 and CSI part2 are not copied), and (iii) HARQ-ACK and CSI part1 (that is, CSI part2 is not copied).

Note that as the method for assigning UCI to a resource in each LBT unit, the same assignment method as that for the NR unlicensed bandwidth (refer to, for example, FIG. 11) may be applied. Alternatively, a different assignment method may be applied.

Figure 16:
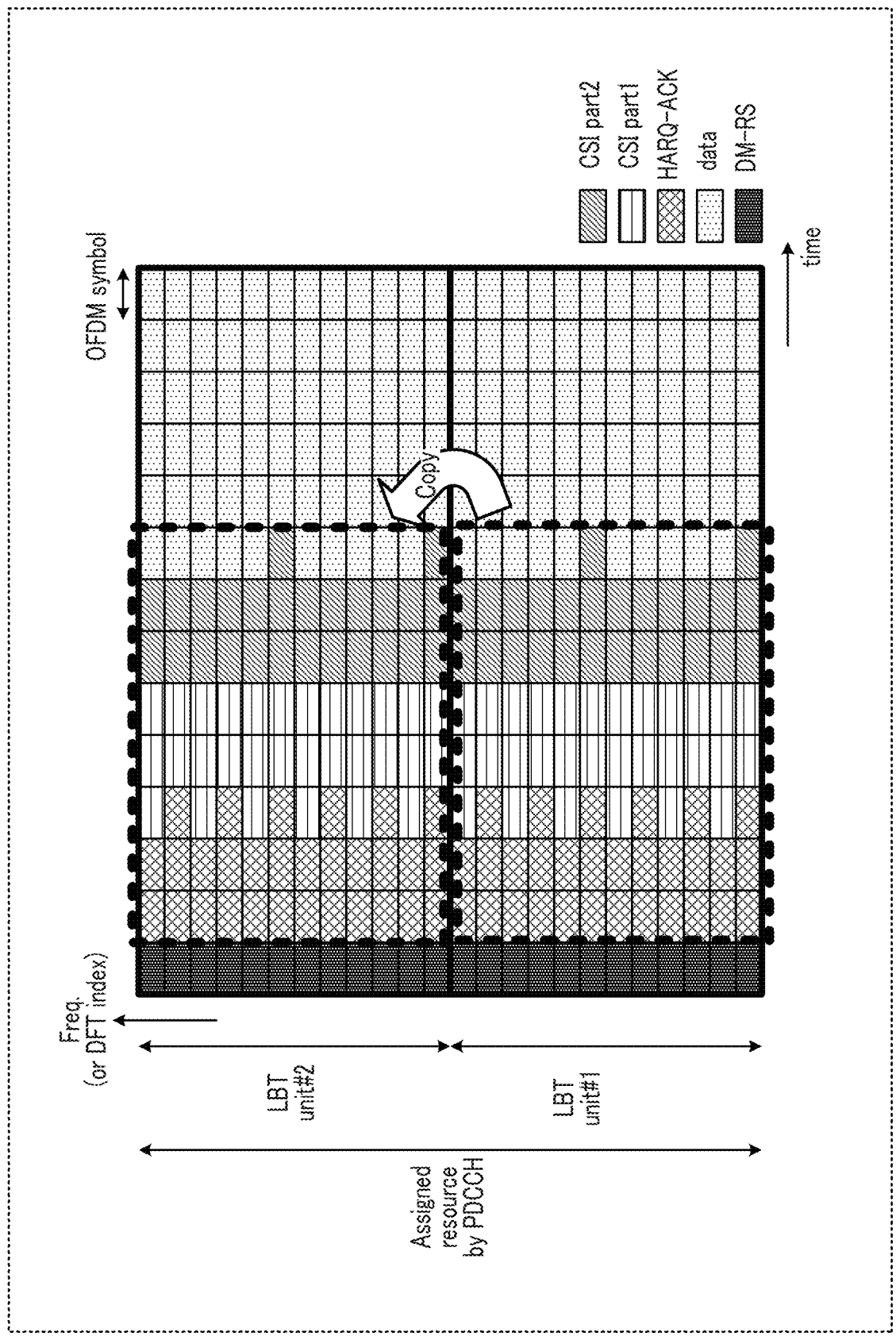
FIG. 16 illustrates an example of resource allocation according to resource determination method 2 of Embodiment 2.
Figure 17:
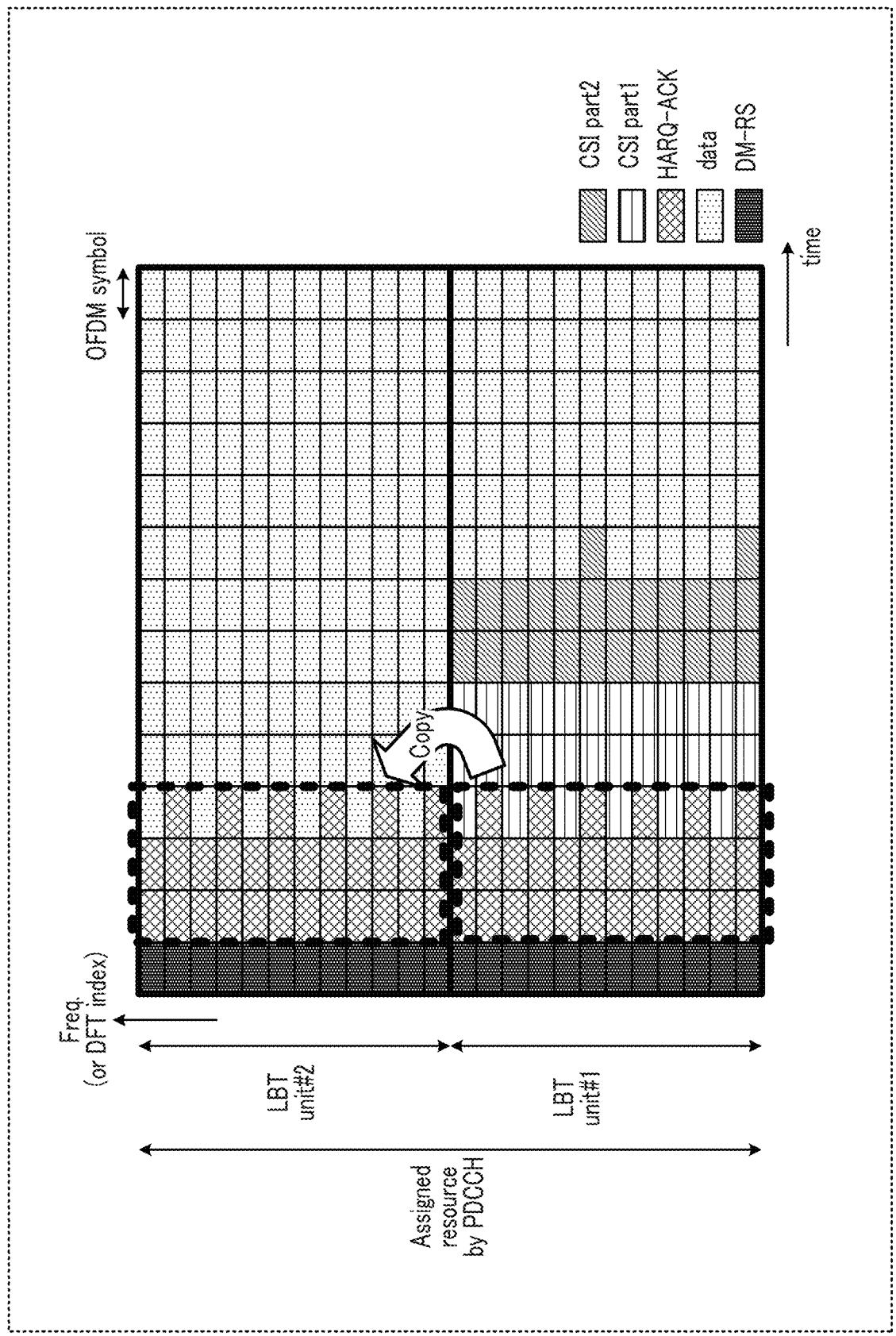
FIG. 17 illustrates an example of other resource allocation according to resource determination method 2 of Embodiment 2.

FIG. 16 and FIG. 17 illustrate an example of resource allocation in resource determination method 2.

In FIGS. 16 and 17, the radio resource (the allocated resource) allocated to terminal 300 by the PDCCH constitute two LBT units (LBT unit #1 and LBT unit #2).

In addition, FIG. 16 illustrates an example in which all of UCI types (for example, HARQ-ACK, CSI part1, and CSI part2) are copied into all of the LBT units. As illustrated in FIG. 16, HARQ-ACK, CSI part1, and CSI part2 are assigned to the resources of both LBT unit #1 and LBT unit #2.

In addition, FIG. 17 illustrates an example in which among the three types of UCIs, HARQ-ACK is copied into all the LBT units. Note that HARQ-ACK is information having a higher importance than the other UCIs (for example, CSI part1 and CSI part2). As illustrated in FIG. 17, HARQ-ACK is assigned to the resources of both LBT unit #1 and LBT unit #2, and CSI part1 and CSI part2 are assigned to the resource of LBT unit #1.

In this way, when there are a plurality of LBT units in the PUSCH resource, terminal 300 copies and transmits at least one piece of UCI information to each of the LBT units. As a result, even if the LBT result of a subset of the LBT units becomes busy, terminal 300 can transmit all the information regarding the UCI copied into the resources of the other LBT units, without any information being punctured.

For example, in FIG. 16, when LBT unit #1 is determined to be Busy and LBT unit #2 is determined to be idle, the UCI assigned to the resource of LBT unit #1 is discarded and is not transmitted. However, all the UCI assigned to the resource of LBT unit #2 is transmitted to base station 400. The same applies even when LBT unit #1 is determined to be idle and LBT unit #2 is determined to be Busy.

As a result, degradation of system performance (for example, the throughput or delay) due to non-transmission of UCI in each of the LBT units in the unlicensed band can be prevented.

In addition, as illustrated in FIG. 17, among the plurality of types of UCIs, the UCI types to be copied into a plurality of LBT units are limited to a subset of the types (HARQ-ACK in FIG. 17). Thus, a decrease in the resource used to transmit data in the PUSCH resource can be prevented.

The LBT unit used to copy the UCI is not limited to all the LBT units in the PUSCH resource, but may be a subset of the LBT units among a plurality of LBT units in the PUSCH resource.

In addition, the type of UCI to be copied into a plurality of LBT units is not limited to HARQ-ACK as illustrated in FIG. 17, and another type of UCI may be used.

<Resource Determination Method 3>

Resource determination method 3 is a method for selecting, from among particular LBT units (hereinafter, referred to as "Primary LBT units") of a plurality of LBT units, a resource to which the UCI (for example, HARQ-ACK, CSI part1 and CSI part2, etc.) transmitted from terminal 300 is assigned.

If a plurality of LBT units are set in the PUSCH resource allocated to terminal 300, base station 400 selects, from among the plurality of LBT units, one LBT unit as the Primary LBT unit and selects the remaining LBT units as "Secondary LBT units".

Base station 400 may indicate, to terminal 300, the Primary LBT unit by, for example, DCI (that is, dynamic signaling) or quasi-static control information (that is, higher layer signaling). Note that indication of the Primary LBT unit is not limited to an explicit indication using the control information, but may be an implicit indication. For example, terminal 300 may set the Primary LBT unit to the LBT unit in which the PDCCH is mapped.

For example, base station 400 selects, as the Primary LBT unit, an LBT unit that is supposed to be less likely to have the LBT result being busy in terminal 300 (that is, an LBT unit that is likely to be idle). For example, the candidates of the LBT unit to be set as the Primary LBT unit are as follows:

(i) The LBT unit with the lowest received power in the LBT (not illustrated) performed by base station 400, and (ii) The LBT unit having the highest idle ratio (that is, the lowest Busy ratio) in the past LBT results (Busy or idle) obtained by terminal 300 and stored by base station 400 on a per LBT unit basis.

Note that the LBT result in terminal 300 can be deduced by base station 400 from the signal detection ratio for each LBT unit in signal detector 209 of base station 400. Note that the candidate (ii) is not limited to the LBT unit having the highest idle ratio in the past LBT results. The LBT unit having a higher idle ratio may be selected as Primary.

Figure 18:
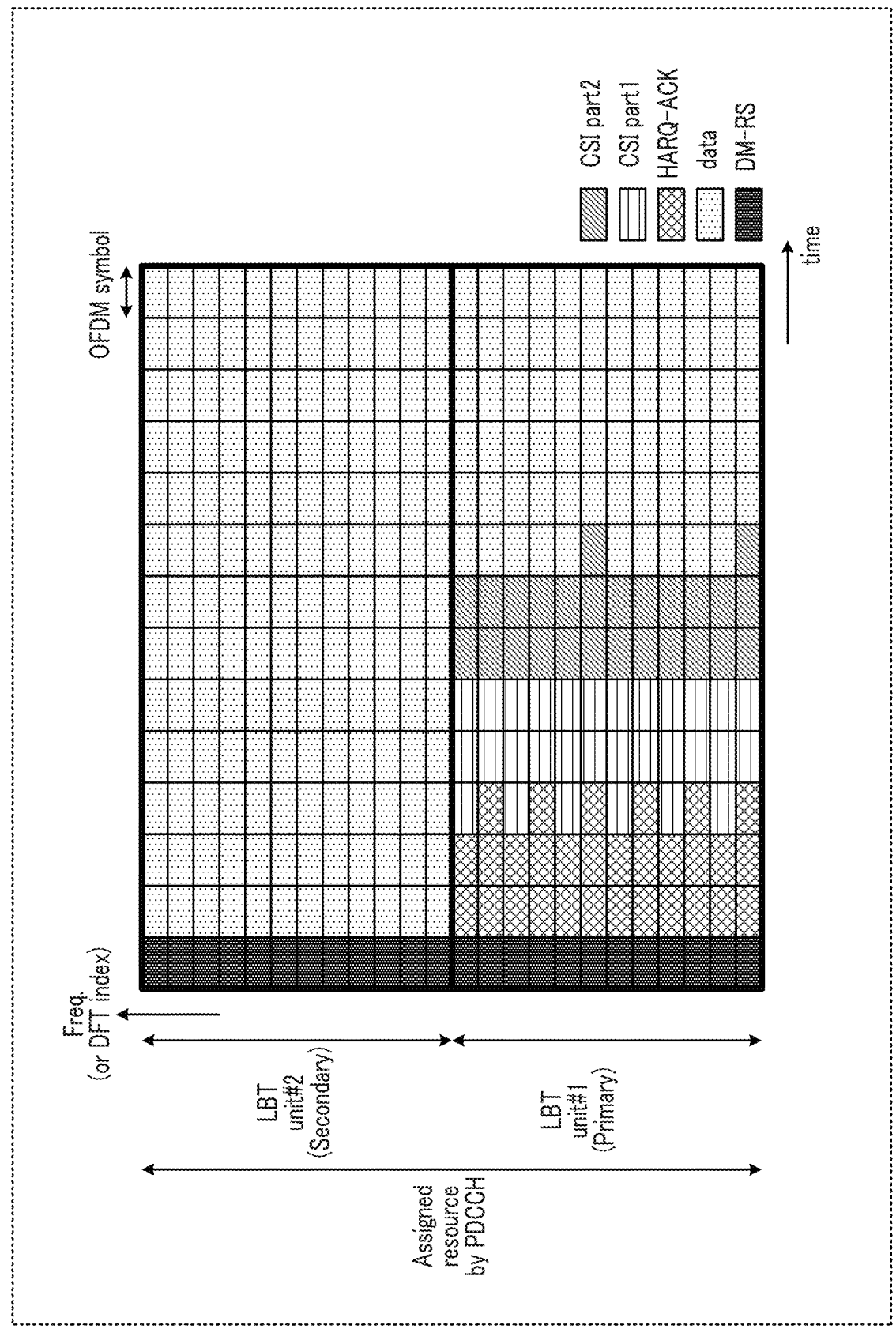
FIG. 18 illustrates an example of resource allocation according to resource determination method 3 of Embodiment 2.

FIG. 18 illustrates an example of resource allocation in resource determination method 3.

In FIG. 18, the radio resource (the allocated resource) allocated to terminal 300 by the PDCCH constitutes two LBT units (LBT unit #1 and LBT unit #2).

In addition, in FIG. 18, LBT unit #1 is a primary LBT unit, and LBT unit #2 is a secondary LBT unit. Accordingly, terminal 300 transmits all the UCIs (for example, HARQ-ACK, CSI part1 and CSI part2) by using the resource of LBT unit #1. That is, terminal 300 does not transmit the UCI in LBT unit #2.

In this way, when there are a plurality of LBT units in the PUSCH resource, terminal 300 transmits the UCI using the LBT unit having the LBT result that is unlikely to be busy (That is, the LBT unit that is likely to be idle). This reduces the probability of the LBT result becoming busy and the UCI being not transmitted.

In this manner, degradation of system performance (for example, the throughput or delay) due to non-transmission of UCI in each of the LBT units in the unlicensed band can be prevented.

Note that FIG. 18 illustrates the case where UCI is transmitted in one LBT unit selected as the Primary LBT unit. However, the resource determination method 3 is not limited thereto. For example, among the plurality of LBT units, a plurality of LBT units each having a higher priority (for example, an LBT unit having a smaller received power or an LBT having a higher idle ratio) may be used to transmit the UCI. Furthermore, in this case, in each of the LBT units, the higher the priority, the more types of UCI to be transmitted may be set.

Resource determination methods 1, 2 and 3 for UCI have been described above.

As described above, according to the present embodiment, base station 400 determines the resource to which the uplink control information (UCI) is to be assigned for each of a plurality of LBT units obtained by dividing a predetermined frequency band allocated to terminal 300. Furthermore, terminal 300 assigns uplink control information to each of a plurality of LBT units obtained by dividing a predetermined frequency band allocated to terminal 300.

This increases the UCI transmission probability even if the LBT result of a subset of the LBT units is busy in the unlicensed bandwidth, which reduces failures in UCI transmission/reception that is more important than data transmission/reception. Thus, degradation of the system performance (for example, the throughput or delay, etc.) can be prevented.

As described above, according to the present embodiment, terminal 300 can appropriately transmit uplink control information (for example, UCI) in the unlicensed band.

Note that at least two of resource determination methods 1, 2 and 3 may be combined.

For example, resource determination method 1 and resource determination method 3 may be combined. More specifically, HARQ-ACK, which is the most important control information of the UCI type, may be assigned to the resource in the Primary LBT unit on the basis of resource determination method 3, and the remaining CSI part1 and CSI part2 may be assigned to the resources in the Secondary LBT unit on the basis of resource determination method 1. For example, if the Primary LBT unit does not have a resource to assign all UCI types, terminal 300 separates the UCI types into those to be transmitted using the Primary LBT unit and those to be transmitted using the Secondary LBT unit and, thus, can transmit all the UCI types.

Furthermore, the Primary LBT unit may be associated with the UCI type transmitted by using the Primary LBT unit. As a result, the signaling in UCI resource allocation method 1 (for example, the signaling information X for selecting the LBT unit for HARQ-ACK) can be reduced.

Embodiment 3

Like Embodiment 2, according to the present embodiment, transmission of uplink control information (for example, UCI) is described. According to Embodiment 2, a method for determining the LBT unit by which each type of UCI is transmitted is described on the basis of a specific rule. However, according to the present embodiment, a method is described for dynamically switching an LBT unit by which UCI is transmitted on the basis of the LBT result in the terminal.

A communication system according to the present embodiment includes terminal 500 and base station 600.

Figure 19:
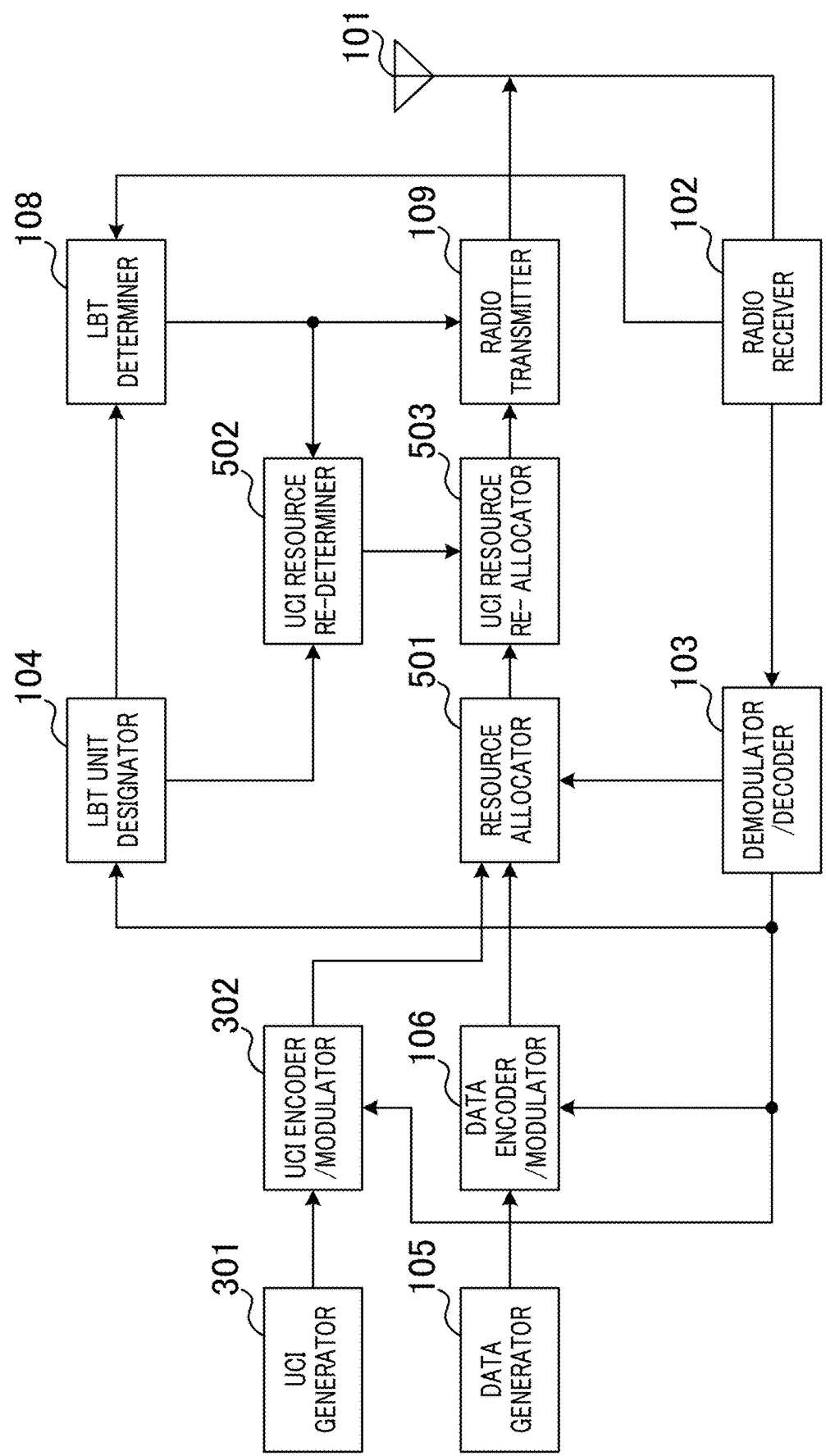
FIG. 19 is a block diagram illustrating the configuration of a terminal according to Embodiment 3.

FIG. 19 is a block diagram illustrating the configuration of terminal 500 according to the present embodiment. Note that the same reference numerals are used in FIG. 19 to describe those configurations that are identical to the configurations of terminal 100 according to Embodiment 1 (FIG. 5) or the configurations of terminal 300 according to Embodiment 2 (FIG. 13), and description of the configurations is not provided.

More specifically, unlike terminal 300, terminal 500 illustrated in FIG. 19 is newly provided with UCI resource re-determiner 502 and UCI resource re-allocator 503 instead of UCI resource determiner 303, and the operation performed by resource allocator 501 is different from that in terminal 300.

Resource allocator 501 assigns a data signal input from data encoder/modulator 106 and UCI input from UCI encoder/modulator 302 to a radio resource (for example, a frequency resource and a time resource) on the basis of the control information (for example, a frequency resource or a time resource) input from demodulator/decoder 103. Resource allocator 501 outputs, to UCI resource re-allocator 503, a transmission signal after resource allocation.

UCI resource re-determiner 502 determines whether to change the resource to which the UCI is assigned on the basis of the information regarding the LBT unit input from LBT unit designator 104 and the channel state of each of the LBT units (for example, the LBT result: idle or Busy) input from LBT determiner 108. If, as a result of the determination, the resource is to be changed, UCI resource re-determiner 502 redetermines (that is, reallocates) a resource to which the UCI is assigned. UCI resource re-determiner 502 outputs, for example, information indicating the presence or absence of a resource change or UCI resource allocation information after the redetermination to UCI resource re-allocator 503. The details of how to change the UCI assignment resource in accordance with the LBT result of each LBT unit is described later.

UCI resource re-allocator 503 reallocates the UCI resource on the basis of the UCI resource allocation information input from UCI resource re-determiner 502. For example, when reassigning UCI to a resource to which data is assigned in the output of resource allocator 501, UCI resource re-allocator 503 discards (Punctures) the data for the resource. UCI resource re-allocator 503 outputs, to radio transmitter 109, the data and the UCI after resource reallocation.

Subsequently, FIG. 20 is a block diagram illustrating the configuration of base station 600 according to the present embodiment. Note that the same reference numerals are used in FIG. 20 to describe those configurations that are identical to the configurations of base station 200 according to Embodiment 1 (FIG. 6) or the configurations of base station 400 according to Embodiment 2 (FIG. 14), and description of the configurations is not provided.

More specifically, unlike base station 400, base station 600 illustrated in FIG. 20 is provided with UCI resource re-determiner 601 instead of UCI resource determiner 401, and the operation performed by demodulator/decoder 602 is different from that in base station 400.

UCI resource re-determiner 601 deduces the resource to which terminal 500 assigned the data and UCI (for example, a resource reallocated to the UCI etc.) on the basis of DCI input from control information generator 204, LBT unit information input from LBT unit designator 202, and information regarding the LBT unit input from signal detector 209 (for example, information indicating the LBT unit in which a signal was detected) and outputs the data indicating the deduced result and UCI assignment information to demodulator/decoder 602. Note that the operation performed by UCI resource re-determiner 601 is the same as the operation performed by UCI resource re-determiner 502 of terminal 500.

Demodulator/decoder 602 demodulates and decodes the reception signal input from radio receiver 208 with respect to the frequency resource in the LBT unit indicated in the information input from signal detector 209 on the basis of the data and UCI assignment information input from UCI resource re-determiner 601 and acquires the data and UCI from terminal 500.

[UCI Resource Redetermination Method]

A UCI resource re-determination method for UCI for use by UCI resource re-determiner 502 of terminal 500 and UCI resource re-determiner 601 of base station 600 is described in detail below.

Resource redetermination methods 1, 2 and 3 for UCI is described below.

<Resource Redetermination Method 1>

Resource redetermination method 1 is a method for reassigning the UCI scheduled to be transmitted in the LBT unit having the LBT result being Busy to an LBT unit having the LBT result being idle.

Figure 21:
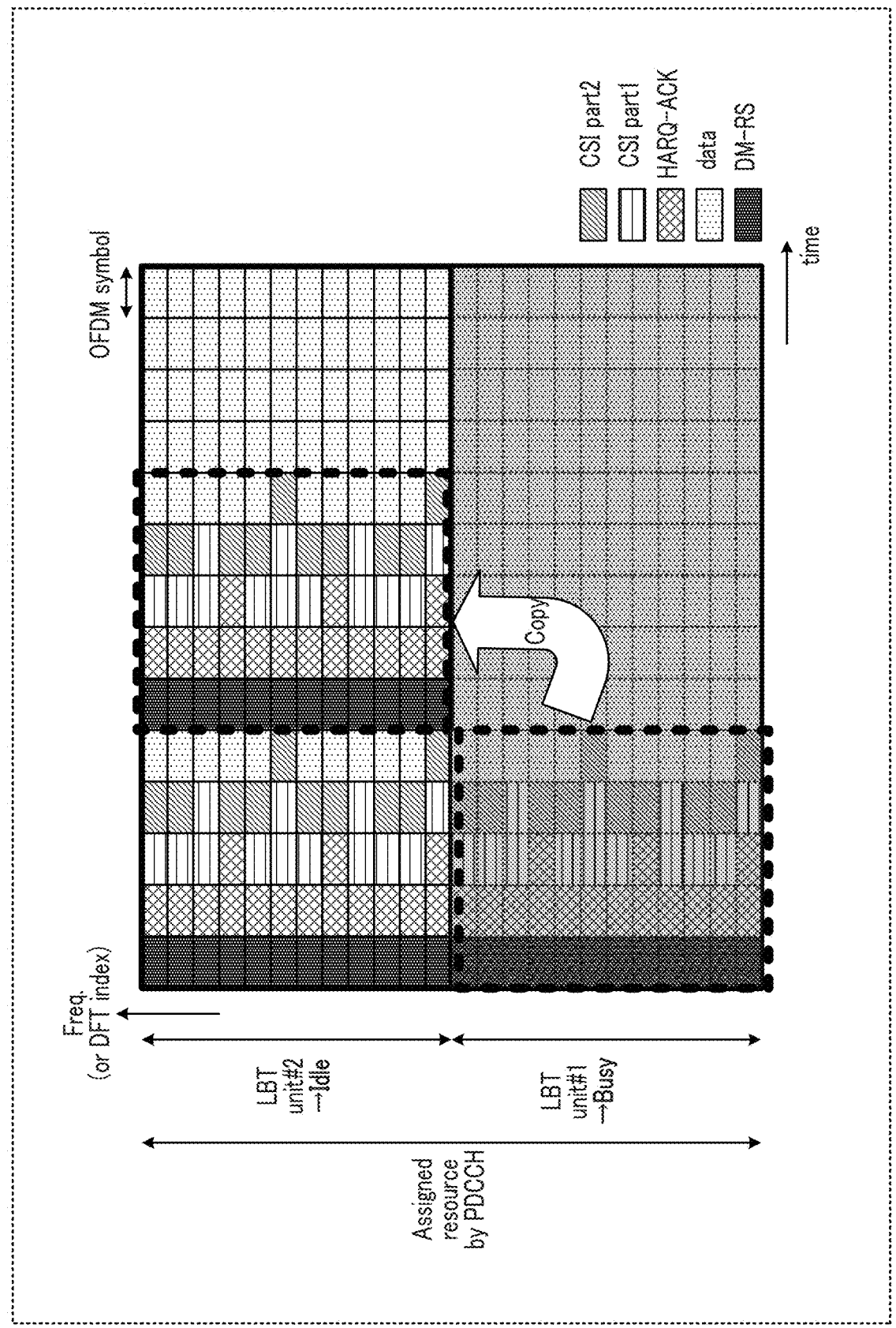
FIG. 21 illustrates an example of resource allocation according to resource redetermination method 1 of Embodiment 3.

FIG. 21 illustrates an example of resource allocation in resource redetermination method 1.

In FIG. 21, the radio resource (the allocated resource) allocated to terminal 500 by the PDCCH constitute two LBT units (LBT unit #1 and LBT unit #2). In addition, as illustrated in FIG. 21, terminal 500 determines that the LBT result of the LBT unit #1 is Busy (for example, the resource is used by another apparatus) and the LBT result of the LBT unit #2 is idle (for example, the resource is not used by another apparatus) on the basis of the LBT determination result of each of the LBT units (in base station 600, the LBT determination result of terminal 500 deduced by signal detector 209).

In this case, terminal 500 reassigns (copies) the UCI assigned to the LBT unit #1 having LBT result being Busy (that is, the UCI scheduled to be transmitted in the LBT unit #1) to the LBT unit #2 having the LBT result being idle.

For example, terminal 500 arranges the LBT units each having the LBT result being idle (for example, referred to as "Idle LBT units") in ascending order of LBT unit number (Idle LBT unit #=0, 1, N (N is a value equal to the number of LBT units being idle−1)). In addition, terminal 500 arranges the LBT units each having the LBT result being Busy (for example, referred to as "Busy LBT units") in ascending order of LBT unit number (Busy LBT unit #=0, 1, M (M is a value equal to the number of LBT units being Busy−1)).

Thereafter, from among the LBT units each having the LBT result being idle, terminal 500 determines the LBT unit (the LBT unit number: AssIdleLBTunit #) to which the UCI scheduled to be transmitted in the LBT unit having the LBT result being Busy is reassigned on the basis of, for example, the following expression 3:

AssIdleLBTunit #=mod(BusyLBTunit #m,N)  (Expression 3).

In expression 3, AssIdleLBT unit # indicates any one of the LBT units having the LBT result being idle (for example, a sort number Idle LBT unit #=0, 1, N arranged in ascending order of the LBT unit number). In addition, BusyLBTunit #m indicates any one of the LBT units having the LBT result being Busy (for example, a sort number Busy LBT unit #=0, 1, M arranged in ascending order of the LBT unit number).

For example, in FIG. 21, BusyLBTunit #m=0 (corresponding to LBT unit #1), and N=1. Accordingly, AssIdleLBTunit #=0 (corresponding to LBT unit #2). Therefore, the UCI of the LBT unit #1 corresponding to BusyLBTunit #m=0 is reassigned to the LBT unit #2 corresponding to the AssIdleLBT unit #=0.

Note that the method for selecting the LBT unit having the LBT result being idle is not limited to the method indicated by expression 3. For example, terminal 500 may use, among the LBT units each having the LBT result being idle, an LBT unit having the LBT unit number closest to the LBT unit number of the LBT unit having the LBT result being Busy and transmit the UCI scheduled to be transmitted in the LBT unit having the LBT result being Busy.

In this way, from among the LBT units each having the LBT result being Idle, terminal 500 selects (redetermines) the LBT unit used to transmit the UCI scheduled to be transmitted in an LBT unit having the LBT result being Busy. For the redetermined LBT unit, for example, terminal 500 assigns UCI that is scheduled to be transmitted in the LBT unit having the LBT result being Busy to any of the OFDM symbols or REs to which the DM-RS and UCI have not already been assigned. For example, the data that is assigned to a resource to which the UCI scheduled to be transmitted using an LBT unit having the LBT result being Busy is Punctured.

Alternatively, terminal 500 may assign, among the plurality of types of UCI scheduled to be transmitted in the LBT unit having the LBT result being Busy, a UCI type having a high importance (for example, HARQ-ACK) to a resource to which, among the plurality of types of UCI scheduled to be transmitted in an LBT unit having the LBT result being idle, a UCI type having a low importance (for example, CSI part2) is assigned. As a result, the UCI scheduled to be transmitted in the LBT unit having the LBT result being Busy is reassigned to a resource to which the UCI is assigned in the LBT unit having the LBT result being idle. Thus, Puncture of data that occurs in the LBT unit having the LBT result being idle can be prevented, and the data throughput can be improved.

Still alternatively, terminal 500 may sequentially assign UCI scheduled to be transmitted in the LBT unit having the LBT result being Busy to the OFDM symbols starting from the last OFDM symbol in the time domain to which the data is assigned in the LBT unit having the LBT result being idle. As a result, by delaying the transmission timing of the reassigned UCI, the UCI reassigned by terminal 500 is highly likely to be re-encoded. For example, terminal 500 may re-encode the UCI in accordance with the resource size of the data portion overwritten (Punctured) with the UCI. That is, when the resource size of the data portion is smaller than the resource size of the UCI having the LBT result being Busy, terminal 500 increases the UCI code rate in re-encoding so that the UCI fits in the resource of the data portion.

In this way, if a plurality of LBT units are set in the PUSCH resource, terminal 500 reassigns the UCI scheduled to be transmitted in the LBT unit having the LBT result being Busy to the LBT unit having the LBT result being idle on the basis of the LBT determination result of each of the LBT units. As a result, even if the LBT result of a subset of the LBT units becomes busy, terminal 500 can transmit the UCI by using another LBT unit.

For example, as illustrated in FIG. 21, if LBT unit #1 is determined to be Busy and LBT unit #2 is determined to be idle, terminal 500 can transmit, in LBT unit #2, the UCI scheduled to be transmitted in LBT unit #1 and the UCI scheduled to be transmitted in LBT unit #2. Note that the same applies even when LBT unit #1 is determined to be idle and LBT unit #2 is determined to be Busy.

As a result, degradation of system performance (for example, the throughput or delay, etc.) due to non-transmission of UCI in each of the LBT units in the unlicensed band can be prevented.

Figure 22:
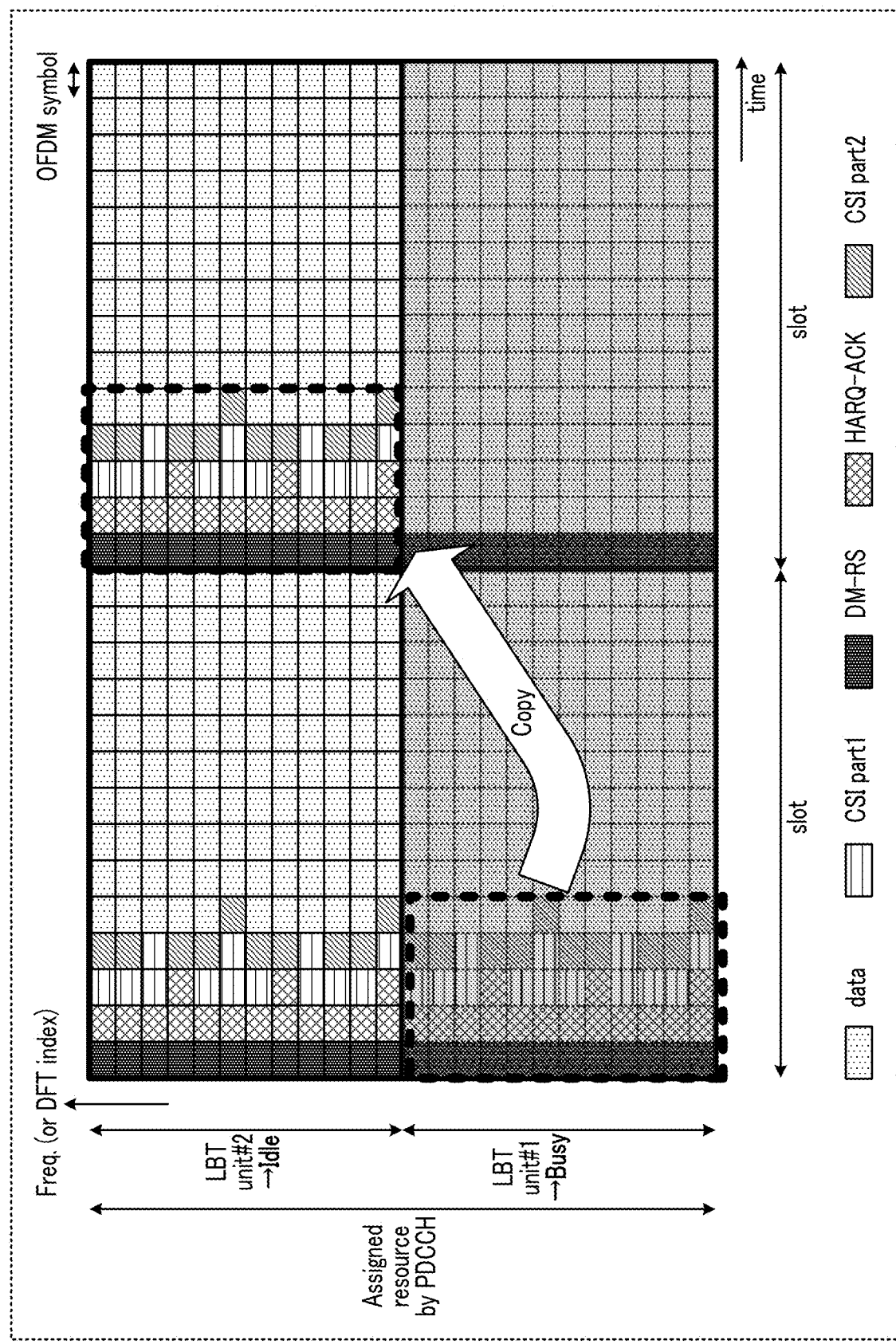
FIG. 22 illustrates an example of other resource allocation according to resource redetermination method 1 of Embodiment 3.

In addition, for example, the case occurs where terminal 500 is instructed to perform PUSCH transmission using a plurality of slots by PDCCH (for example, control by "Number of scheduled subframes" in DCI format OB of LTE-LAA). In this case, as illustrated in FIG. 22, terminal 500 may assign the UCI scheduled to be transmitted in the LBT unit having the LBT result being Busy to the PUSCH region of the next slot in the LBT unit having the LBT result being idle and transmit the UCI. As a result, the same effect as that of resource redetermination method 1 described above can be obtained. In addition, since, in FIG. 22, the UCI is transmitted in the next slot, terminal 500 can set aside enough processing time to reassign the UCI resource. For example, terminal 500 can obtain an effect that enables re-encoding or re-rate matching of the data and the UCI if the processing time is sufficient.

Note that in FIG. 22, the case has been described where the UCI is reassigned to PUSCH in the slot next to the slot in which the LBT result is determined to be Busy. However, the present embodiment is not limited thereto, and the UCI can be reassigned to PUSCH in a slot subsequent to the next slot.

<Resource Redetermination Method 2>

Resource redetermination method 2 is a method for reassigning the UCI scheduled to be transmitted in the LBT unit having the LBT result being Busy to a PUCCH region in the LBT unit having the LBT result being idle.

Figure 23:
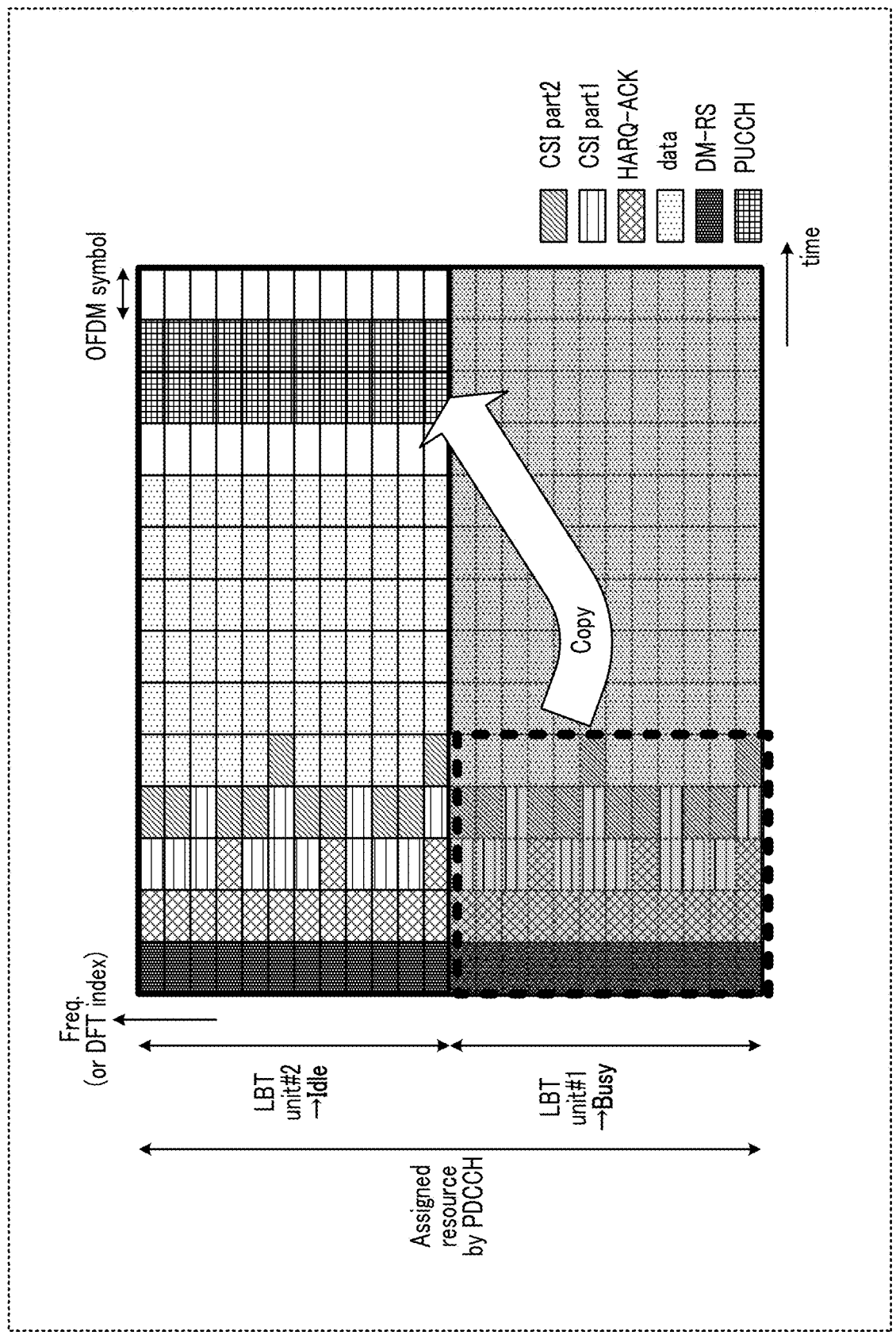
FIG. 23 illustrates an example of resource allocation according to resource redetermination method 2 of Embodiment 3.

FIG. 23 illustrates an example of resource allocation in resource redetermination method 2.

In FIG. 23, the radio resource allocated to terminal 500 by the PDCCH constitute two LBT units (LBT unit #1 and LBT unit #2). In addition, as illustrated in FIG. 23, terminal 500 determines that the LBT result of LBT unit #1 is Busy and the LBT result of LBT unit #2 is idle, on the basis of the LBT determination result of each of the LBT units (in base station 600, the LBT determination result of terminal 500 deduced by signal detector 209).

As illustrated in FIG. 23, if the PUCCH radio resource (the PUCCH resource) exists at the same timing as the PUSCH transmission timing (for example, in the same slot), terminal 500 reassigns (copies) the UCI scheduled to be transmitted in LBT unit #1 having the LBT result being Busy into the PUCCH region of LBT unit #2 having the LBT result being idle.

As a result, even if the LBT result of a subset of the LBT units becomes busy, terminal 500 can transmit the UCI in another LBT unit. Therefore, degradation of system performance (for example, the throughput or delay, etc.) due to non-transmission of UCI in each of the LBT units in the unlicensed band can be prevented.

Furthermore, according to resource redetermination method 2, since the UCI is reassigned to the PUCCH, Puncture of the data assigned to PUSCH can be prevented when the UCI is reassigned and, thus, the data throughput can be improved.

<Resource Redetermination Method 3>

Resource redetermination method 3 is a method for reassigning the UCI scheduled to be transmitted in the LBT unit having the LBT result being Busy to the resources of the LBT unit from the time when the LBT result of the LBT unit changes to idle.

Figure 24:
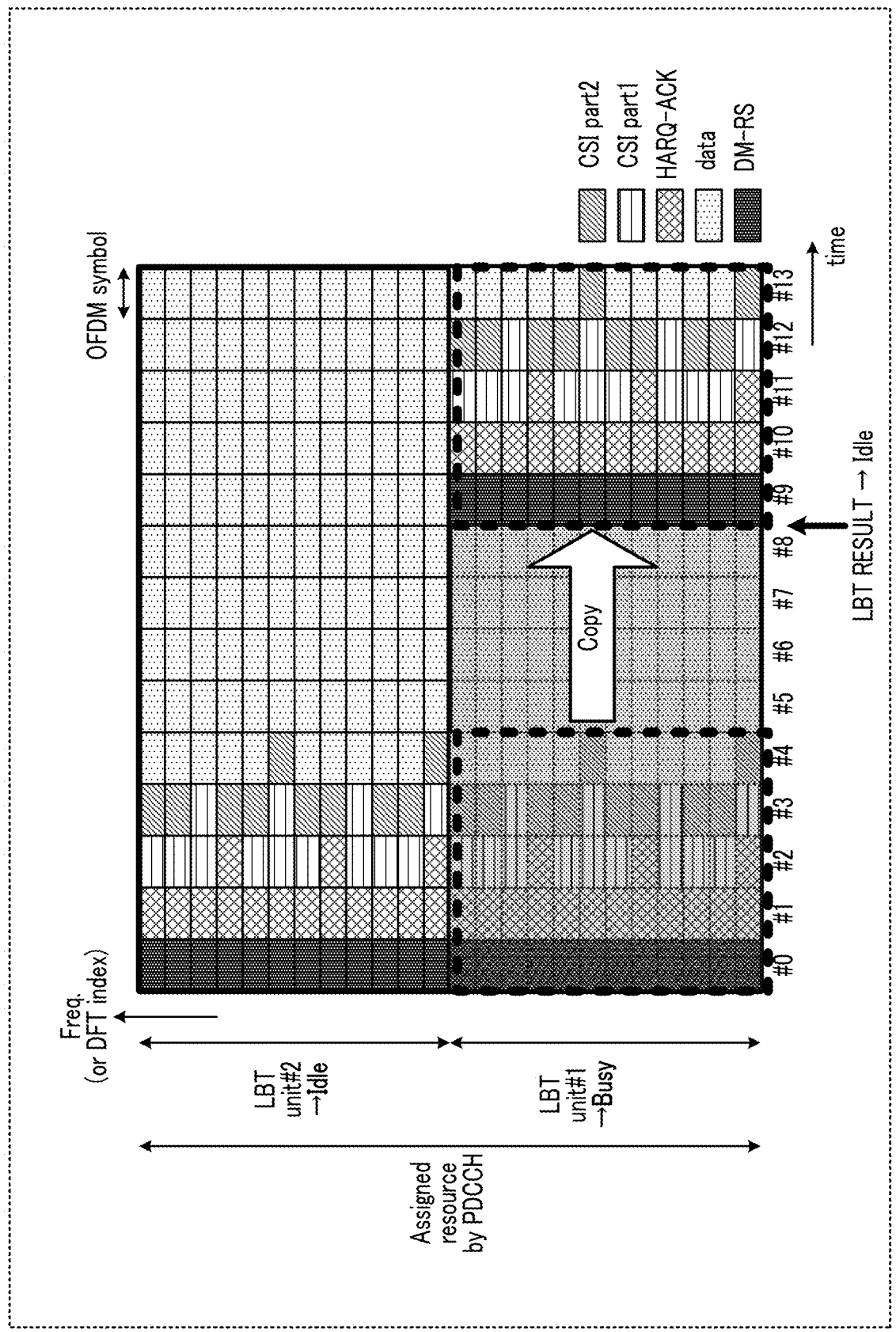
FIG. 24 illustrates an example of resource allocation according to resource redetermination method 3 of Embodiment 3.

FIG. 24 illustrates an example of resource allocation in resource redetermination method 3.

In FIG. 24, the radio resources allocated to terminal 500 by the PDCCH constitute two LBT units (LBT unit #1 and LBT unit #2). In addition, as illustrated in FIG. 24, terminal 500 determines that the LBT result of the LBT unit #1 is Busy and the LBT result of the LBT unit #2 is idle on the basis of the LBT determination result of each of the LBT units (in base station 600, the LBT determination result of terminal 500 speculated by signal detector 209).

As illustrated in FIG. 24, after the LBT determination, terminal 500 transmits the PUSCH signal including the UCI from the OFDM symbol #0 in the LBT unit #2 having the LBT result being idle, while in LBT unit #1 having the LBT result being Busy, terminal 500 discards the PUSCH signal including the UCI and does not transmit the PUSCH signal.

In addition, during the PUSCH transmission in LBT unit #2 having the LBT result being idle, terminal 500 continues the LBT determination (for example, LBT in the 25 us interval) at least in LBT unit #1 having the LBT result being Busy. For example, terminal 500 may continue the LBT determination until the LBT result becomes idle.

In FIG. 24, in the PUSCH transmission using the LBT unit #2 having the LBT result being idle (OFDM symbol #9 in FIG. 24), the LBT result of the LBT unit #1 is changed from Busy to idle. Accordingly, from the time (OFDM symbol #9) when the LBT result changes to idle in the LBT unit #1 having the LBT result changed from Busy to idle, terminal 500 assigns, to the resource of LBT unit #1, the UCI, the data, and DM-RS scheduled to be transmitted using the OFDM symbols starting from OFDM symbol #0 in the LBT unit #1 and transmits the UCI, the data, and DM-RS.

Note that if the number of OFDM symbols for transmitting PUSCH indicated by base station 600 (14 OFDM symbols from symbols #0 to #13 in FIG. 24) is reached, terminal 500 stops transmission in LBT unit #1. Although FIG. 24 illustrates the case where the UCI is transmitted at the time when the LBT result changes from Busy to idle, the present embodiment is not limited thereto. The UCI may be transmitted at a predetermined point in time after the time when the LBT result changes from Busy to idle.

In this way, the UCI assigned to the LBT unit having the LBT result being Busy is reassigned to the resource after the time when the LBT result is determined to be idle in that LBT unit. If a plurality of LBT units are set in the PUSCH resource, terminal 500 reassigns, on the basis of the LBT determination result of each LBT unit, the UCI scheduled to be transmitted in an LBT unit having the LBT result being Busy after the LBT result is changed to idle in the LBT unit. As a result, even if the LBT result of a subset of the LBT units becomes busy, terminal 500 can transmit the UCI without part of the UCI being punctured.

In this manner, degradation of system performance (for example, the throughput or delay) due to non-transmission of UCI in each of the LBT units in the unlicensed band can be prevented.

Resource redetermination methods 1, 2 and 3 for UCI have been described above.

As described above, according to the present embodiment, base station 600 determines the resource to which the uplink control information (UCI) is to be assigned for each of a plurality of LBT units obtained by dividing the predetermined frequency band allocated to terminal 500. In addition, terminal 500 assigns uplink control information to each of a plurality of LBT units obtained by dividing a predetermined frequency band allocated to terminal 500.

This increases the UCI transmission probability even if the LBT result of a subset of the LBT units is busy in the unlicensed bandwidth, which reduces failures in UCI transmission/reception that is more important than data transmission/reception. Thus, degradation of the system performance (for example, the throughput or delay, etc.) can be prevented.

Furthermore, terminal 500 and base station 600 reassign the resource allocated to the UCI to the resource of the LBT unit having the LBT result being idle in accordance with the channel state of each LBT unit. As a result, even if the LBT result of the LBT unit corresponding to the resource allocated to the UCI is Busy, terminal 500 can transmit the UCI to base station 600 without discarding the UCI, so that degradation of the system performance (for example, the throughput or delay, etc.) can be prevented.

As described above, according to the present embodiment, terminal 500 can appropriately transmit uplink control information (for example, UCI) in the unlicensed band.

According to the present embodiment, for example, as illustrated in FIGS. 21 to 24, an example has been described in which terminal 500 reassigns all UCI types (e.g., HARQ-ACK, CSI part1, CSI part2) scheduled to be transmitted in an LBT unit having the LBT result being Busy to an LBT unit having the LBT result being idle. However, terminal 500 does not have to reassign all the UCI types. For example, terminal 500 may select the UCI type to be reassigned in accordance with the priorities of the UCI types. The priorities may be set such that HARQ-ACK>UCI part1>UCI part2, for example. For example, in reassigning, terminal 500 does not have to assign the UCI type having a low priority if the resource to which the UCI is to be assigned is insufficient.

In addition, according to the present embodiment, the case has been described where the data assigned to the resource to which UCI is reassigned is Punctured. However, for example, if terminal 500 has time to perform re-encoding or re-rate matching after determining the LBT result and before transmitting PUSCH, terminal 500 may perform re-encoding or re-rate matching on the data and UCI without Puncturing the data and assign a resource to the data and UCI.

In this case, to secure the resource for the UCI, terminal 500 may change the parameter "α" that determines the upper limit of the number of REs of the UCI and the value of $\beta_{\textit{offset}}^{PUSCH}$, which is a correction coefficient of the code rate of HARQ-ACK for the data, in expression 1. For example, terminal 500 increases the value of α or decreases the value of $\beta_{\textit{offset}}^{PUSCH}$ in accordance with the number of LBT units each having the LBT result being Busy (that is, the LBT units in which LBT has failed).

In this way, if terminal 500 has time to perform re-encoding or re-rate matching on the data and UCI after determining the LBT result and before transmitting the PUSCH, terminal 500 performs re-encoding or re-rate matching on the data and UCI while changing the value of α or $\beta_{\textit{offset}}^{PUSCH}$. Thus, Puncture of data can be prevented while securing a resource for transmitting the UCI. As a result, the data throughput can be improved.

In addition, according to the present embodiment, if the resource size for the data to be punctured becomes large due to UCI resource reallocation (for example, if the data resource size to be punctured exceeds a predetermined threshold value), terminal 500 may stop transmitting the data and transmit the UCI. By stopping transmission of the data, the power consumption of terminal 500 can be reduced. Furthermore, by stopping transmitting the data, terminal 500 can improve the UCI reception quality at base station 600 by increasing the UCI transmission power if terminal 500 has surplus transmission power.

The embodiments have been described above.

Other Embodiments (1) It should be noted that at least two of the above embodiments 1, 2 and 3 may be combined and applied.

For example, Embodiment 1 and one of Embodiment 2 and Embodiment 3 may be applied at the same time. That is, for both data and UCI, an uplink signal may be assigned on a per LBT unit basis.

Furthermore, for example, resource determination method 3 according to Embodiment 2 (refer to, for example, FIG. 18) and resource redetermination method 2 according to Embodiment 3 (refer to, for example, FIG. 23) may be combined. That is, the PUCCH may be mapped in the Primary LBT unit. As a result, the terminal can transmit, for example, the UCI scheduled to be transmitted in a Busy LBT unit by using the PUCCH mapped in the Primary LBT unit.

Furthermore, for example, resource determination method 2 according to Embodiment 2 (refer to, for example, FIG. 16 or FIG. 17) and the resource redetermination method 1 according to Embodiment 3 (refer to, for example, FIG. 21) may be combined. That is, the UCI may be assigned to the LBT unit on a per UCI type basis, and the UCI to be transmitted in the LBT unit having the LBT result being Busy may be reassigned to the resource of the LBT unit having the LBT result being idle. As a result, the terminal can flexibly assign and reassign the UCI to an LBT unit on a per UCI type basis.

Furthermore, for example, resource redetermination method 3 according to Embodiment 3 (refer to, for example, FIG. 24) may be applied to Embodiment 1. That is, the data (UL-SCH) scheduled to be transmitted in an LBT unit having the LBT result being Busy may be transmitted after the time when the LBT result changes from Busy to idle in that LBT unit.

Other combinations of methods may be applied, not limited to examples of the combinations of the above-described embodiments or methods.

Figure 25:
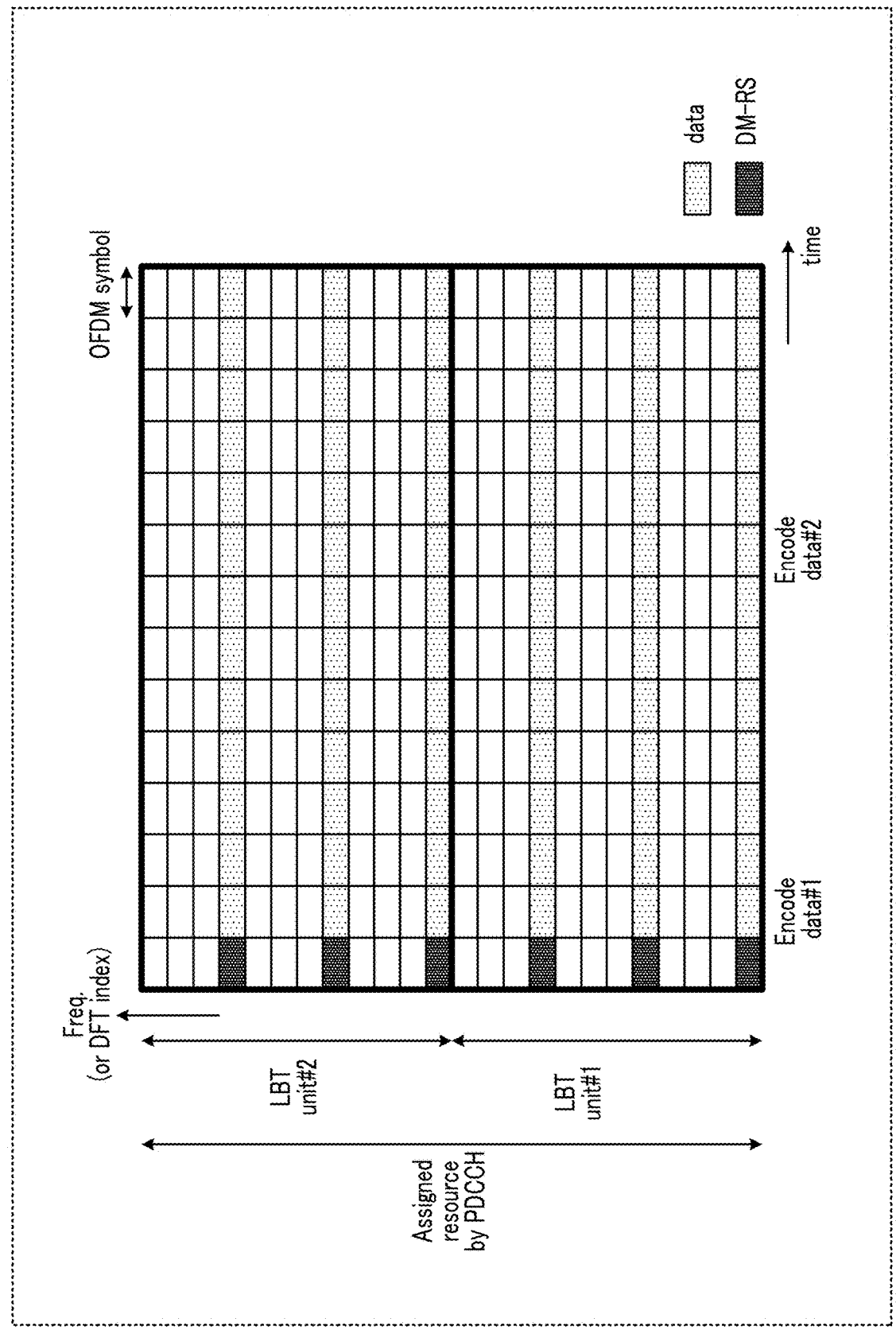
FIG. 25 illustrates an example of discrete frequency allocation.

(2) Furthermore, while the above embodiments have been described with reference to an example in which PUSCH is assigned to continuous frequency bands, PUSCH is not limited to the case where it is assigned to continuous frequency bands. For example, as illustrated in FIG. 25, the above embodiments are also applicable when PUSCH is assigned to discrete frequency resources by using IFDM (Interleaved Frequency Division Multiplexing), B-IFDM (Block IFDM), or the like.

(3) Furthermore, while the above embodiments have been described with reference to the case where DM-RS is mapped to the first OFDM symbol, that is, an example of PUSCH resource allocation Type B (PUSCH mapping type B) in NR, the PUSCH resource allocation method is not limited to PUSCH mapping type B. For example, a PUSCH assignment method using PUSCH mapping type A may be used. That is, even when the DM-RS is mapped to a symbol other than the first OFDM symbol (for example, the third symbol), the above embodiments are applicable.

(4) Furthermore, while the above embodiments have been described with reference to an example of the case where the number of OFDM symbols to which PUSCH is assigned (for example, the number of OFDM symbols in one slot) is 14 symbols, the number of OFDM symbols is not limited to 14 symbols. The number may be any number of OFDM symbols. In addition, while the above embodiments have been described with reference to, as an example, the case where two LBT units are set for a terminal, the number of LBT units set for the terminal may be three or more.

(5) Furthermore, the transmission band of PUSCH indicated by PDCCH is not limited to a resource in one Component Carrier. For example, even when the transmission band of PUSCH indicated by PDCCH band extends over a plurality of Component Carriers and, thus, a plurality of LBT units are set in the transmission band, the above embodiments can be applied in a similar manner. Still furthermore, even when the transmission band of PUSCH indicated by PDCCH extends over a plurality of BWPs (BandWidth Parts) and, thus, a plurality of LBT units are set in the transmission band, the above embodiments can be applied in a similar manner.

(6) Furthermore, while the above embodiments have been described with reference to the case where a plurality of LBT units are set in the transmission band of PUSCH indicated by UL grant (PDCCH), the embodiments are not limited thereto. For example, even when a plurality of LBT units are set in the band for transmitting PUSCH in the case of PUSCH transmission without UL grant (also referred to as GUL (Grant Free Uplink) transmission or AUL (Autonomous Uplink) transmission), the above embodiments can be applied in a similar manner.

(7) Furthermore, while the above embodiments have been described with reference to Type2 LBT, the type of LBT is not limited to Type2. For example, the above embodiments are also applicable to Type1 in which LBT is performed in the interval of (9 us*CW_size) before PUSCH transmission in a similar manner (note that CW size is a value determined by a random number).

The other embodiments have been described above.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A terminal according to one embodiment of the present disclosure includes: circuitry, which, in operation, assigns an uplink signal to each of a plurality of bands obtained by dividing a predetermined frequency band, each of the plurality of bands serving as a unit for determining use or non-use of a resource by another apparatus; and a transmitter, which in operation, transmits the uplink signal.

In the terminal according to one embodiment of the present disclosure, the uplink signal includes uplink data, and the uplink data is encoded in units of data assigned to each of the bands.

In the terminal according to one embodiment of the present disclosure, in a case where multi-carrier transmission is applied in an uplink data channel, among the uplink data, data to be assigned respectively to the bands are mapped to resources in a frequency domain first and second in a time domain of the bands.

In the terminal according to one embodiment of the present disclosure, in a case where single-carrier transmission is applied in uplink, among the uplink data, data to be assigned respectively to the bands are mapped to resources in a Discrete Fast Fourier (DFT) domain first and second in a time domain, and the uplink data is subjected to DFT processing for each of the bands.

In the terminal according to one embodiment of the present disclosure, the uplink signal includes uplink control information, and the uplink control information is assigned to each of the bands in accordance with a type of the uplink control information.

In the terminal according to one embodiment of the present disclosure, the uplink signal includes uplink control information, and among the uplink control information, at least one type of information is copied and assigned to the plurality of bands.

In the terminal according to one embodiment of the present disclosure, the uplink signal includes uplink control information, and the uplink control information is assigned to a particular band among the plurality of bands.

In the terminal according to one embodiment of the present disclosure, the particular band is indicated from a base station to the terminal by dynamic signaling or higher layer signaling.

In the terminal according to one embodiment of the present disclosure, the particular band is a band to which a downlink control channel has been mapped among the plurality of bands.

In the terminal according to one embodiment of the present disclosure, the uplink signal assigned to, among the plurality of bands, a first band for which use of the resource by the other apparatus is determined is reallocated to, among the plurality of bands, a second band for which non-use of the resource by the other apparatus is determined.

In the terminal according to one embodiment of the present disclosure, the uplink signal assigned to the first band is assigned to a slot subsequent to a slot to which the uplink signal is assigned in the second band.

In the terminal according to one embodiment of the present disclosure, the uplink signal assigned to the first band is assigned to an uplink control channel in the second band.

In the terminal according to one embodiment of the present disclosure, the uplink signal assigned to, among the plurality of bands, a first band for which use of the resource by the other apparatus is determined is assigned to a resource at or after a timing at which non-use of the resource by the other apparatus is determined in the first band.

A base station according to one embodiment of the present disclosure includes: circuitry, which, in operation, determines a resource to which an uplink signal is assigned for each of a plurality of bands obtained by dividing a predetermined frequency band, each of the plurality of bands serving as a unit for determining use or non-use of a resource by another apparatus; and a receiver, which in operation, receives the uplink signal in the determined resource.

A transmission method according to one embodiment of the present disclosure includes: assigning an uplink signal to each of a plurality of bands obtained by dividing a predetermined frequency band, each of the plurality of bands serving as a unit for determining use or non-use of a resource by another apparatus; and transmitting the uplink signal.

A reception method according to one embodiment of the present disclosure includes: determining a resource to which an uplink signal is to be assigned for each of a plurality of bands obtained by dividing a predetermined frequency band, each of the plurality of bands serving as a unit for determining use or non-use of a resource by another apparatus; and receiving the uplink signal in the determined resource.

The disclosure of Japanese Patent Application No. 2018-148463, filed on Aug. 7, 2018, including the specification, drawings and abstract, is incorporated herein by reference in its entirety.

INDUSTRIAL APPLICABILITY

An embodiment of the present disclosure is useful for mobile communication systems.

REFERENCE SIGNS LIST

100, 300, 500 Terminal
101, 207 Antenna
102, 208 Radio receiver
103, 210, 402, 602 Demodulator/decoder
104, 202 LBT unit designator
105 Data generator
106 Data encoder/modulator
107, 203, 304, 501 Resource allocator
108 LBT determiner
109, 206 radio transmitter
200, 400, 600 Base station
201 Controller
204 Control information generator
205 Encoder/modulator
209 Signal detector
301 UCI generator
302 UCI encoder/modulator
303, 401 UCI resource determiner
502, 601 UCI resource re-determiner
503 UCI resource re-allocator

The invention claimed is:

1. A terminal, comprising:
resource allocation circuitry, which, in operation, determines whether each of a plurality of bands is busy or idle; and
a transmitter, which in operation, transmits an uplink signal using idle bands of the plurality of bands, the uplink signal including multiple types of uplink control information, wherein
the resource allocation circuitry, in operation, determines, according to a type of the uplink control information, to copy and assign at least one type of the uplink control information to the idle bands.

2. The terminal according to claim 1, wherein:
the uplink signal includes uplink data, and
the uplink data is encoded in units of data assigned to each of the idle bands.

3. The terminal according to claim 2, wherein:
in a case where multi-carrier transmission is applied in an uplink data channel, among the uplink data, data to be assigned respectively to the idle bands are mapped to resources in a frequency domain first and second in a time domain of the bands.

4. The terminal according to claim 2, wherein:
in a case where single-carrier transmission is applied in uplink, among the uplink data, data to be assigned respectively to the idle bands are mapped to resources in a Discrete Fast Fourier (DFT) domain first and second in a time domain, and
the uplink data is subjected to DFT processing for each of the idle bands.

5. The terminal according to claim 1, wherein:
the uplink control information is assigned to a particular band among the plurality of bands.

6. The terminal according to claim 5, wherein:
the particular band is indicated from a base station to the terminal by dynamic signaling or higher layer signaling.

7. The terminal according to claim 5, wherein:
the particular band is a band to which a downlink control channel has been mapped among the plurality of bands.

8. The terminal according to claim 1, wherein:
the uplink signal assigned to, among the plurality of bands, a first band determined to be busy is reallocated to, among the plurality of bands, a second band determined to be idle.

9. The terminal according to claim 8, wherein:
the uplink signal assigned to the first band is assigned to a slot subsequent to a slot to which the uplink signal is assigned in the second band.

10. The terminal according to claim 8, wherein:
the uplink signal assigned to the first band is assigned to an uplink control channel in the second band.

11. The terminal according to claim 1, wherein:
the uplink signal assigned to, among the plurality of bands, a first band determined to be busy is assigned to a resource at or after a timing determined to be idle in the first band.

12. A base station, comprising:
a controller, which, in operation, determines whether each of a plurality of bands is busy or idle; and
a receiver, which in operation, receives an uplink signal in a plurality of idle resources, the uplink signal including multiple types of uplink control information, wherein
the controller, in operation, determines, according to a type of the uplink control information, that at least one type of the uplink control information has been copied and assigned to idle bands.

13. A transmission method, comprising:
determining whether each of a plurality of bands is busy or idle; and
transmitting an uplink signal using idle bands of the plurality of bands, the uplink signal including multiple types of uplink control information, wherein the transmission method comprises:
determining, according to a type of the uplink control information, to copy and assign at least one type of the uplink control information to the idle bands.

14. A reception method, comprising:
determining whether each of a plurality of bands is busy or idle; and
receiving an uplink signal in a plurality of idle resources, the uplink signal including multiple types of uplink control information, wherein the reception method comprises:
determining, according to a type of the uplink control information, that at least one type of the uplink control information has been copied and assigned to idle bands.

\* \* \* \* \*